US012014427B1

(12) United States Patent
Arriaga

(10) Patent No.: US 12,014,427 B1
(45) Date of Patent: Jun. 18, 2024

(54) APPARATUS AND METHODS FOR CUSTOMIZATION AND UTILIZATION OF TARGET PROFILES

(71) Applicant: Influential Lifestyle Insurance LLC, Scottsdale, AZ (US)

(72) Inventor: Jason Arriaga, Scottsdale, AZ (US)

( * ) Notice: Subject to any disclaimer, the term of this patent is extended or adjusted under 35 U.S.C. 154(b) by 0 days.

(21) Appl. No.: 18/231,519

(22) Filed: Aug. 8, 2023

(51) Int. Cl.
*G06Q 40/08* (2012.01)
(52) U.S. Cl.
CPC .................................. *G06Q 40/08* (2013.01)
(58) Field of Classification Search
None
See application file for complete search history.

(56) References Cited

U.S. PATENT DOCUMENTS

| | | | | |
|---|---|---|---|---|
| 8,595,103 | B1 * | 11/2013 | Wargin | G06Q 10/06 705/38 |
| 10,346,922 | B2 * | 7/2019 | Steele | G06Q 40/08 |
| 10,546,340 | B1 * | 1/2020 | Ross | G06Q 40/08 |
| 11,798,090 | B1 * | 10/2023 | Nazir | G06N 3/084 |
| 2012/0022917 | A1 * | 1/2012 | Lawton | G06Q 30/0202 705/7.31 |
| 2012/0072239 | A1 * | 3/2012 | Gibbard | G06Q 40/02 707/758 |
| 2013/0110736 | A1 | 5/2013 | Savage | |
| 2013/0305356 | A1 * | 11/2013 | Cohen-Ganor | H04L 63/1416 726/22 |
| 2015/0088556 | A1 * | 3/2015 | Convery | G06Q 40/08 705/4 |
| 2015/0220835 | A1 * | 8/2015 | Wilson | G06Q 30/0269 706/46 |
| 2016/0292800 | A1 * | 10/2016 | Smith | G06Q 50/16 |
| 2021/0158451 | A1 * | 5/2021 | Blazek | G06Q 40/08 |
| 2022/0005121 | A1 * | 1/2022 | Hayward | G06N 3/044 |
| 2022/0327627 | A1 * | 10/2022 | Magoon | G06Q 40/08 |

OTHER PUBLICATIONS

Roman, Victor; "Unsupervised Machine Learning: Clustering Analysis" retrieved from <https://towardsdatascience.com/unsupervised-machine-learning-clustering-analysis-d40f2b34ae7e> Oct. 24, 2020. (also referenced in U.S. Pat. No. 11,798,090 / Victor Roman, article of Mar. 6, 2019.) (Year: 2020).*

* cited by examiner

*Primary Examiner* — Benjamin S Brindley
(74) *Attorney, Agent, or Firm* — Caldwell Intellectual Property Law

(57) ABSTRACT

An apparatus for customization and utilization of target profiles, the apparatus comprising: a processor and a memory communicatively connected to the processor, the memory containing instructions configuring the processor to receive a data set comprising a plurality of target data, determine a validity status of the plurality of target data within the data set, modify the data set as a function of the validity status, determine one or more protection gaps within the modified data set using a gap finder module, generate one or more target profiles as function of the modified data set, the one or more protection gaps, and a user input, and modify a graphical user interface as a function of one or more target profiles.

18 Claims, 8 Drawing Sheets

US 12,014,427 B1

APPARATUS AND METHODS FOR CUSTOMIZATION AND UTILIZATION OF TARGET PROFILES

FIELD OF THE INVENTION

The present invention generally relates to the field of target profiles. In particular, the present invention is directed to customization and utilization of target profiles.

BACKGROUND

Current systems used to generate target profiles do not properly determine the validity of the target profiles prior to generation. In addition, current systems used to generate target profiles are lacking with respect to user interaction.

SUMMARY OF THE DISCLOSURE

In an aspect, an apparatus for customization and utilization of target profiles is described. The apparatus includes a processor and a memory communicatively connected to the processor, the memory containing instructions configuring the processor to receive a data set having a plurality of target data, determine a validity status of the plurality of target data within the data set and modify the data set as a function of the validity status. The processor is further configured to determine one or more protection gaps within the modified data set using a gap finder module, generate one or more target profiles as function of the modified data set, the one or more protection gaps, and a user input and modify a graphical user interface as a function of one or more target profiles.

In another aspect a method for customization and utilization of target profiles is described. The method includes receiving, by at least a processor, a data set having a plurality of target data, determining, by the at least a processor, a validity status of the plurality of target data within the data set, modifying, by the at least a processor, the data set as a function of the validity status, determining, by the at least a processor, one or more protection gaps within the modified data set using a gap finder module, generating, by the at least a processor, one or more target profiles as function of the modified data set, the one or more protection gaps, and a user input, and modifying, by the at least a processor, a user interface as a function of one or more target profiles.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for customization and utilization of target profiles. Aspect of the present disclosure include a processor and a memory communicatively connected to the processor. Aspects of the disclosure further include a graphical user interface.

Aspects of the present disclosure can be used to parse through data sets and determine a validity status of the elements within the data sets. Aspects of the present disclosure can also be used to generate target profiles for a particular target. Exemplary embodiments illustrating aspects of the present disclosure are described below in the context of several specific examples.

Figure 1:
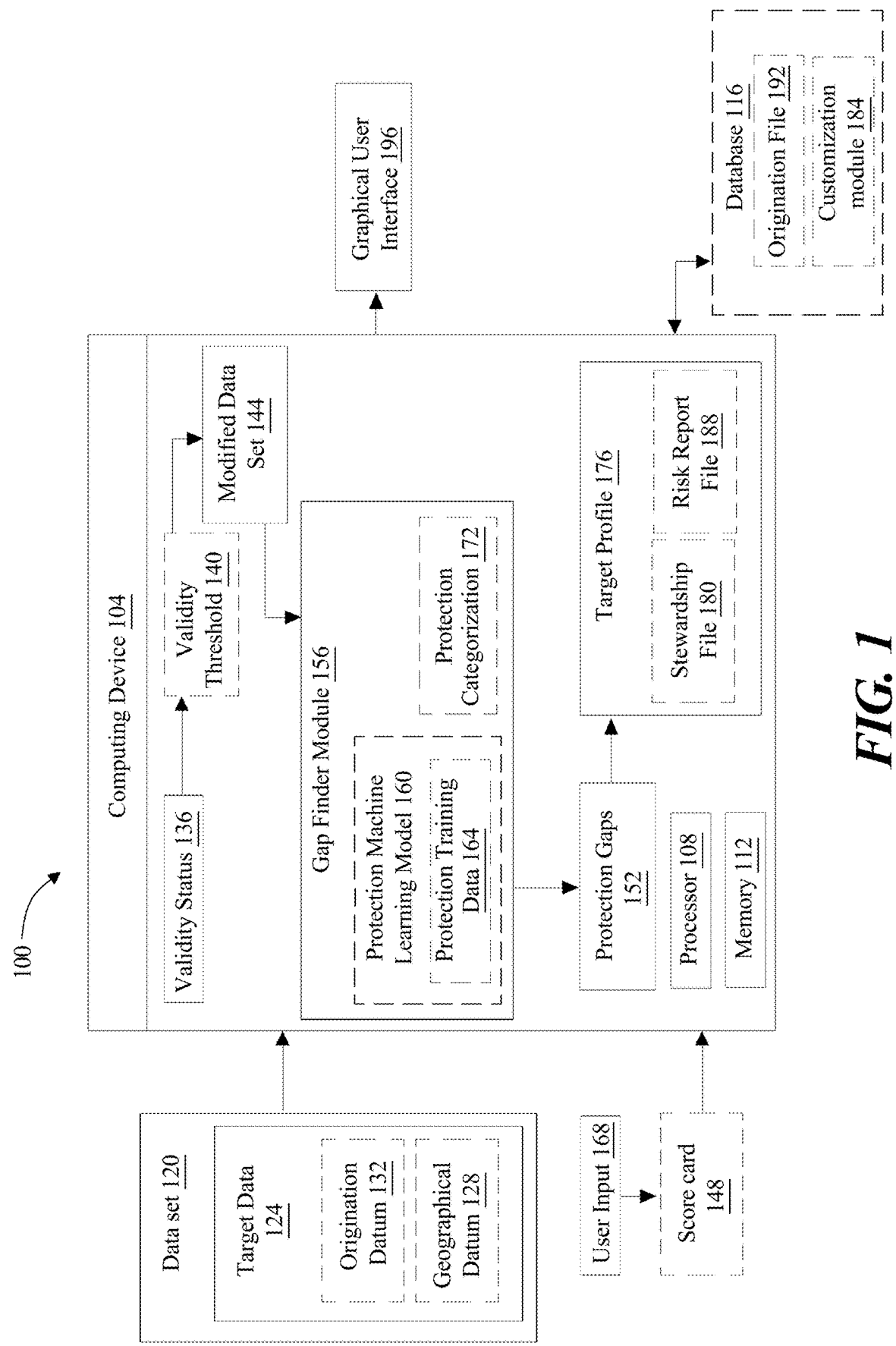
FIG. 1 is a block diagram of an exemplary embodiment of an apparatus for customization and utilization of target profiles.

Referring now to FIG. 1, apparatus 100 for customization and utilization of target profiles is described. Apparatus 100 includes a computing device 104. Apparatus 100 includes a processor 108. Processor 108 may include, without limitation, any processor 108 described in this disclosure. Processor 108 may be included in a and/or consistent with computing device 104. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, apparatus 100 includes a memory 112 communicatively connected to processor 108. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, apparatus 100 may include a database 116. Database 116 may be implemented, without limitation, as a relational database, a key-value retrieval database such as a NOSQL database, or any other format or structure for use as database that a person skilled in the art would recognize as suitable upon review of the entirety of this disclosure. Database may alternatively or additionally be implemented using a distributed data storage protocol and/or data structure, such as a distributed hash table or the like. Database 116 may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

Still referring to FIG. 1, processor 108 is configured to receive a data set 120 having a plurality of target data 124. "Data set," for the purposes of this disclosure, is a collection of related information. Data set 120 includes a plurality of target data 124. "Target data," for the purposes of this disclosure, is information relating to a potential target that a user may have an interest in communicating with. For example, target data 124 may include contact information associated with the potential target. Target data 124 may include basic background information such as age, gender, height, weight, marital status, contact information (e.g. email, phone, address etc.), address, address of residency, and the like. Target data 124 may further include assets owned by the individual (e.g. properties, homes, apartments buildings, cars, trucks, boats, airplanes, helicopters, expensive watches, jewelry, cash on hand, stocks and the like). Target data 124 may further include an individual's net worth, an individual's interest in other corporations and/or assets and the like. Target data 124 may further include an individual's current insurance plans, if any. The information pertaining to insurance plans may include price paid, the scope of the coverage, the amount being covered, the assets being covered, the policy expiration term and the like. In some cases, target data 124 may further include geographical datum 128. "Geographical datum" for the purposes of this disclosure is information relating to the location of one or more individuals or components. Geographical datum 128 may include the residency of the target, the location of one or more properties owned by the target, the location of one or more assets associated with the target and the like. In some cases, geographical datum 128 may include the geographical location of any element described within target data 124.

With continued reference to FIG. 1, target data 124 may further include any data describing one or more assets owned by the target. This may include assets within a target's home, individuals (other than the target) residing on one or more properties, individuals who may be associated with and/or may have control over one or more assets (e.g. an individual may take possession to drive a car, the individual may take control of a property, and the like). In some cases, target data 124 may further include previous accidents (e.g. car accidents, house fires, loss or damage of assets due to unforeseen circumstances, loss or damage of assets due to negligence, loss or damage of assets due to natural disasters, loss or damage of assets due to recklessness, intent, or knowledge, and the like) of each individual associated with one or more assets of the target. In some cases, target data 124 may further include the costs associated with the loss or damage of one or more assets. This may include the costs to replace, the cost to repair and the like. In some cases, target data 124 may further include costs associated with the loss or damage of assets or individuals that may be attributed to the target. This may include the damage to a vehicle as a result of negligence by the individual. This may further include, but is not limited to, loss of life or damage to another individual that may be attributed to the individual.

With continued reference to FIG. 1, target data 124 may further include assets such as a target's art, a target's jewelry and the like and information indicating if the target has covered the assets under an insurance policy and the information relating to the policy. In some cases, target data 124 may further include if a particular target employs domestic staff (e.g. security, cleaning maids, nanny's gardeners etc.) and any corresponding insurance information.

Wirth continued reference to FIG. 1, target data 124 may further include origination datum 132. "Origination datum" for the purposes of this disclosure is information relating to the source of the information within target data 124 that has been received. Origination datum 132 may include the information of the individual (also known as "originator") who retrieved target data 124. This may include but is not limited to, the name of the individual, the address, an entity associated with the individual, a unique identifier used to identify the individual and the like. In some cases, each of the plurality of target data 124 may include a separate origination datum 132. In some cases, data set 120 may include a singular origination datum 132 that describe the origin of the data set 120. As used in the current disclosure, an "entity" is an organization comprised of one or more persons with a specific purpose. An entity may include a corporation, organization, business, group one or more persons, and the like.

With continued reference to FIG. 1, target data 124 may further include images of one or more assets described within target data 124. For example, target data 124 may include an image of a user's home, property, and/or any other assets described within target data 124. In some cases, target data 124 may include one or more images and any other information associated with the one or more images, such as location of the assets, description of the assets and the like.

With continued reference to FIG. 1, data set 120 may include received digital files, such as digital spreadsheet, digital word document and the like. In some cases data set 120 may include a digital spreadsheet wherein the spread sheet may contain categorizations of varying elements. Such as for example, the spreadsheet may contain a column for names of each target, a column of addresses, a column for assets and the like.

With continued reference to FIG. data set 120 may include data from files or documents that have been converted in machine-encoded test using an optical character reader (OCR). For example, a user may input digital records and/or scanned physical documents that have been converted to digital documents, wherein data set 120 may include data that have bene converted into machine readable text. In some embodiments, optical character recognition or optical character reader (OCR) includes automatic conversion of images of written (e.g., typed, handwritten, or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases, OCR may be an "offline" process, which analyses a static document or image frame. In some cases, handwriting movement analysis can be used as input for handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image components. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from the background of the image component. In some cases, binarization may be required for example if an employed OCR algorithm only works on binary images. In some cases, a line removal process may include the removal of non-glyph or noncharacter imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify a script allowing an appropriate OCR algorithm to be selected. In some cases, a character isolation or "segmentation" process may separate signal characters, for example, character-based OCR algorithms. In some cases, a normalization process may normalize the aspect ratio and/or scale of the image component.

Still referring to FIG. 1, in some embodiments, an OCR process will include an OCR algorithm. Exemplary OCR algorithms include matrix-matching process and/or feature extraction processes. Matrix matching may involve comparing an image to a stored glyph on a pixel-by-pixel basis. In some cases, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at the same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 4-6. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. The second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 4, 5, and 6.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make use of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, processor 108 may be configured to retrieve data set 120 from a database. Database may be populated with a plurality of data sets 120, wherein a user may select a particular data set 120 for processing. In some cases, the plurality of data sets 120 may be transmitted by a third party such as a financial advisor, a referral agency, a referral agent, or any other individual. In some cases, a user may select a particular from a plurality of data sets 120 for processing. In some cases, the plurality of data sets 120 may include data sets 120 that have currently not been processed by apparatus 100. In some cases, processor 108 may retrieve a particular data set 120 and assign a label to the data set 120 indicating that the data set 120 has now been used for processing. In some cases, data set 120 may be transmitted to a user. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. Processor 108 may transmit the data described above to database wherein the data may be accessed from database. In some cases, data set 120 may be transmitted through one or more stand-alone software and/or websites capable of transmitting information. This includes but is not limited, email software, financial software, database software and the like.

With continued reference to FIG. 1, data set 120 and/or elements thereof may be received by a chatbot system. A "chatbot system" for the purposes of this disclosure is a program configured to simulate human interaction with a user with a user in order to receive or convey information. In some cases, chatbot system may be configured to receive data set 120 and/or elements thereof through interactive questions presented to the user. the questions may include, but are not limited to, questions such as "What is your name?", "What is your date of birth?", "Please list any assets owned having a value of above 1,000$?" and the like. In some cases, computing device 104 may be configured to present a comment box through a user interface wherein a user may interact with the chatbot and answer the questions through input into the chat box. In some cases, questions may require selection of one or more pre-configured answers. For example, chatbot system may ask a user to select the appropriate salary range corresponding to the user, wherein the user may select the appropriate range from a list of pre-configured answers. In situations where answers are limited to limited responses, chatbot may be configured to display checkboxes wherein a user may select a box that is most associated with their answer. In some cases, chatbot may be configured to receive data set 120 or target data 124 and through an input. In some cases, each question may be assigned to a particular categorization wherein a response to the question may be assigned to the same categorization. For example, a question prompting a user to input an income may be assigned to an income categorization wherein a response from the user may also be assigned to the income categorization.

With continued reference to FIG. 1, data set 120 may be retrieved using a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, computing device 104 may generate a web crawler to compile data set 120. The web crawler may be seeded and/or trained with a reputable website, such as government websites. A web crawler may be generated by computing device 104. In some embodiments, the web crawler may be trained with information received from a user through a user interface. In some embodiments, the web crawler may be configured to generate a web query. A web query may include search criteria received from a user. For example, a user may submit a plurality of websites for the web crawler to search to extract any data suitable for data set 120.

With continued reference to FIG. 1, processor 108 is configured to determine a validity of the plurality of target data 124 within data set 120. "Validity status" for the purposes of this disclosure is a determination of whether a particular target associated with target data 124 may be fit for processing. For example, processor 108 may determine that a particular target would not be a good fit as a potential client. Similarly, processor 108 may determine that a target does not have enough information necessary for customization and/or utilization. For example, target data 124 may be missing a client's contact information wherein a user may not be able to contact the client. In another non-limiting example, processor 108 may determine that a client is not fit for any insurance plans wherein the client would not be useful to the user. In some cases, a validity status 136 may include information indicating whether a target is fit for processing. In some cases, the validity status 136 may include an indication of "valid" or "invalid". In some cases, validity status 136 may include numerical indications as to the validity of a user wherein a '1' may indicate the target data 124 is valid and a '0' may indicate the data is invalid. In some cases, validity status 136 may further include a determination as to why the account was invalid. For example, processor 108 may be configured to generate information indicating that a name is missing, or a particular element is missing and the like. In some cases, processor 108 may be configured to parse through data set 120 and determine the presence of one or more elements. In some cases, each element within target data 124 may be sorted and/or assigned to a particular categorization wherein processor 108 may be configured to determine the presence of an element with a particular categorization. For example, processor 108 may be configured to determine the presence of an income within an income categorization wherein absence of the income element may indicate that a particular target data 124 is invalid. Additionally or alternatively, invalid status may contain information that an income element within target data 124 is missing. In some cases, processor 108 may be configured to determine the presence of one or more elements within target data 124. In some cases, processor 108 may receive target data 124 sorted into one or more categorizations wherein processor 108 may determine a validity status 136 based on the presence of an element in each categorization. For example, processor 108 may be configured to generate an invalidity status 136 stating that a target's assets and income are missing when the categorization relating to assets or income is empty. In some cases, processor 108 may receive data set 120 and/or target data 124 in the form of a spreadsheet wherein processor 108 may determine a validity status 136 based on the presence of elements within the spreadsheet. For example, processor 108 may determine that a particular target data 124 is missing a information within a particular cell, a particular column, and/or a particular row wherein processor 108 may be configured to determine that the target data 124 is invalid. In some cases, computing device 104 may inform a user that one or more elements are missing from data set 120 based on validity status 136. For example, a user may be informed that a particular data set 120 is missing a name, an address, a particular financial element (e.g. income, taxes, etc.) and the like. In some cases, computing device 104 may utilize a web crawler to search for one or more missing elements within data set 120 as a function of validity status. In some cases, the webcrawler may be configured to search for information that has been deemed 'invalid.' In some cases, the webcrawler may be configured to search for elements of data set and/or target data 124 wherein a particular element may be searched for and input into to data set 120 and/or target data 124 for further processing.

With continued reference to FIG. 1, in some cases, validity status 136 may be based off of a persons' income, financial assets, current insurance rates and the like. For example, processor 108 may determine that a particular individual does not contain the requisite income or requisite assets suitable for processing. In some cases, processor 108 may determine the validity status 136 of a user by comparing one or more elements within target data 124 to one or more validity thresholds 140. "Validity threshold" for the purposes of this disclosure is one or more limits or requirements used to indicate whether an element within target data 124 is valid. For example, validity threshold 140 may income a particular income limit wherein a target must have a minimum income in order to be considered valid. In another non-limiting example, validity threshold 140 may include a minimum asset requirement wherein the user's assets are compared to a minimum asset value to be considered. In some cases, validity threshold 140 may include thresholds such as but not limited to, limits on geographic location, limits in income, limits on assets, limits on liabilities and any other limits or requirements that may be suitable for determining the validity status 136 of an individual. In some cases, the plurality of target data 124 may be compared to a validity threshold 140 wherein processor 108 may determine a validity status 136 based on whether a particular element satisfies or surpasses the validity threshold 140.

With continued reference to FIG. 1, processor 108 may be configured to classify the first data set 120 to one or more target categorizations. "Target categorization" for the purposes is a grouping of data within data set 120 used to identify elements within data set 120. For example, target categorization may be used to identify assets, income, liabilities, and the like within data set 120 and categorize the data into one or more target categorizations. In some cases, target categorization may include groupings such as contact information, assets, liabilities, incomes, geographic location, current insurance provider, current insurance coverage, and the like. In some cases, each element within data set 120 may be assigned to a particular target categorization. In some cases, each element with target may be assigned to a particular target categorization. In some cases, each target data 124 of the plurality of target data 124 may contain similar elements assigned to similar categorization. For example, an element within a first target data 124 may be assigned to a particular target categorization whereas an element within a second target data 124 may be assigned to the dame categorizations. Elements may be classified using a classifier such as a machine learning model. In some cases, one or more target categorizations may be used to label various elements data set 120.

With continued reference to FIG. 1, the use of a classifier to classify first data set 120 to one or more target classifications enables for accurate determination of the validity of first data set 120. The classification of first data set 120 into target classifications allows for quick determination of validity for first data set as rules may be quickly applied to particular target classifications in order to determine the validity.

With continued reference to FIG. 1, a "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. Classifiers as described throughout this disclosure may be configured to output at least a datum that labels or otherwise identifies a set of data that are clustered together, found to be close under a distance metric as described below, or the like. In some cases, processor 108 may generate and train a target classifier configured to receive data set 120 and output one or more target categorizations. Processor 108 and/or another device may generate a classifier using a classification algorithm, defined as a process whereby a computing device 104 derives a classifier from training data. In some cases target classifier may use data to prioritize the order of labels within data set 120. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. A target classifier may be trained with training data correlating data set 120 to descriptor groupings such as simplifiers, multipliers, and the like. Training data may include a plurality of data sets 120 and/or target data 124 correlated to a plurality of target categorizations. In an embodiment, training data may be used to show that a particular element within data set 120 may be correlated to a particular target categorization. Training data may be received from an external computing device 104, input by a user, and/or previous iterations of processing. A target classifier may be configured to receive as input and categorize components of data set 120 to one or more target categorizations. In some cases, processor 108 and/or computing device 104 may then select any elements within data set 120 containing a similar label and/or grouping and group them together. In some cases, data set 120 may be classified using a classifier machine learning model. In some cases classifier machine learning model may be trained using training data correlating a plurality of data sets 120 correlated to a plurality of target categorizations. In an embodiment, a particular element within data set 120 may be correlated to a particular target categorization. In some cases, classifying data set 120 may include classifying data set 120 as a function of the classifier machine learning model. In some cases classifier training data may be generated through input by a user. In some cases, classifier machine learning model may be trained through user feedback wherein a user may indicate whether a particular element corresponds to a particular class. In some cases, classifier machine learning model may be trained using inputs and outputs based on previous iterations. In some cases, a user may input previous data set 120 and corresponding target categorizations wherein classifier machine learning model may be trained based on the input.

With continued reference to FIG. 1, in some embodiments, classifier training data may be iteratively updated using feedback. Feedback, in some embodiments, may include user feedback. For example, user feedback may include a rating, such as a rating from 1-10, 1-100, −1 to 1, "happy," "sad," and the like. In some embodiments, user feedback may rate a user's satisfaction with the target categorization. In some embodiments, feedback may include outcome data. "Outcome data," for the purposes of this disclosure, is data including an outcome of a process. As a non-limiting example, outcome data may include information regarding whether a target made a purchase, whether a target has continued communications, and the like. Iteratively updating classifier training data may include removing data sets and target categorizations from classifier training data as a function of negative or unfavorable feedback. In some embodiments, each data sets and target categorization within classifier training data may have an associated weight. That weight may be adjusted based on feedback. For example, the weight may be increased in response to positive or favorable feedback, while the weight may be decreased in response to negative or unfavorable feedback.

With continued reference to FIG. 1, computing device 104 and/or processor 108 may be configured to generate classifiers as described throughout this disclosure using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process for the purposes of this disclosure. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors for the purposes of this disclosure may be scaled, such that each vector represents each attribute along an equivalent scale of values. Each vector may be "normalized," or divided by a "length" attribute, such as a length attribute l as derived using a Pythagorean norm:

$$l = \sqrt{\sum\nolimits_{i=0}^{n} a_i^2},$$

where is $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, processor 108 may be configured to determine a validity status 136 as a function of the target categorizations. In some cases, processor 108 may retrieve a plurality of validity thresholds 140 from a database wherein each validity threshold 140 corresponds to a particular target categorization. In some cases, processor 108 may be configured to compare elements within target data 124 to one or more validity thresholds 140 to determine a validity status 136.

With continued reference to FIG. 1, processor 108 may further be configured to determine a validity status 136 as a function of a score card 148. "Score card" for the purposes of this disclosure is information indicating a target's interest in communicating with a user and engaging in one or more customizations of the protection of their assets. Score card 148 may include ratings based on an interaction conducted with the client. For example, score card 148 may include a rating or score of the client's interest, a rating based on the client's eagerness and the like. In some cases, score card 148 may further include any new or updated information that may be used to update target data 124. In some cases, validity status 136 may be determined based on score card 148 wherein a lower score on score card 148 may indicate that the client is not interested, and a higher score may indicate the client is interested. In some cases, a user may communicate with one or more targets and input one or more score cards 148 into computing device 104 wherein validity status 136 may be generated as a function of the score card 148.

With continued reference to FIG. 1, processor 108 is configured to modify the data set 120 as a function of the validity status 136. Processor 108 may modify data set 120 by removing any target data 124 that may be considered invalid based on validity status 136. For example, processor 108 may be configured to remove target data 124 having one or more missing elements or target data 124 associated with individuals who don't meet a predetermined criterion. In some cases, data set 120 may be modified to create a modified data set 144, wherein elements within modified data set 144 may be found in data set 120 as well. In some cases, modified data set 144 may include only target data 124 that processor 108 has determined to have a validity status 136 indicating that the target is valid.

With continued reference to FIG. 1, processor 108 is configured to determine one or more protection gaps 152 within modified data sets 144 using a gap finder module 156. "Gap finder module" for the purposes of this disclosure is one or more computing algorithms that may be used to make one or more determinations about a gap in a target's insurance coverage. In some cases gap finder module 156 may take one or more inputs, such as a data set 120 and/or target data 124 and output one or more outputs such as one or more protection gaps 152. Processor 108 and/or another computing device 104 may be configured to process one or more algorithms within gap finder module 156. "Protection gap" for the purposes of this disclosure is information indicating that a particular target's insurance coverage is limiting or does not fully cover one or more elements or aspects described within target data 124. For example, protection gap 152 may include information indicating that a particular insurance does not cover the full price of the target's car. Protection gap 152 may further include information indicating that a target's home insurance does not cover fire insurance, flood insurance, earthquake insurance and the like. Protection gap 152 may further include information indicating that a target's policy limits are too low in comparison to the target's net worth or assets. For example, a target may contain an insurance policy limit of 15,000$ but the target may have over 1 million dollars in assets. In some cases, protection gap 152 may further include information indicating that a user does not have 'gap insurance' which is additional protection that may protect a target from liability over the target's policy limit. Protection gap 152 may further include information indicating that one or more assets indicated within target data 124 may not be covered by the user. This may include a watch, newly purchased cars, newly purchased homes, and the like. In some cases, protection gap 152 may further include any determination that any element or asset indicated within target data 124 may be lacking in terms of insurance coverage.

With continued reference to FIG. 1, gap finder module 156 is configured to receive one or more inputs such as modified data set 144, data set 120 and and/or target data 124 and output one or more protection gaps 152. Processor 108 may be configured to retrieve gap finder module 156 from database. In some cases, gap finder module 156 may include a rule-based system. "Rule-based system" also known as "rule-based engine" is a system that executes one or more rules such as, without limitations, such as a protection rule in a runtime production environment. As used in this disclosure, a "protection rule" is a pair including a set of conditions and a set of actions, wherein each condition within the set of conditions is a representation of a fact, an antecedent, or otherwise a pattern, and each action within the set of actions is a representation of a consequent. In a non-limiting example, support rule may include a condition of "when policy limit is below a user's assets" pair with an action of "generate a protection gap 152 indicating that a user's policy limit is too low." In some embodiments, rule-based engine may execute one or more protection rules on data if any conditions within one or more protection rules are met. Data may include data set 120, target data 124 and/or any other data described in this disclosure. In some embodiments, protection rule may be stored in a database as described in this disclosure. Additionally, or alternatively, rule-based engine may include an inference engine to determine a match of protection rule, where any or all elements within modified data set 144 may be represented as values for linguistic variables measuring the same. In some cases, each rule within protection rule may include a rule and a corresponding action associated with the rule. In some cases, protection rule may include a rule such as "if the asset does is not fully covered under an insurance policy" and a corresponding action indicating "generate a protection indicating that an asset is not fully covered under the insurance policy". In some cases, inference engine may be configured to determine which rule out of a plurality of rules should be executed with respect to a particular element within modified data set 144. For example, inference engine may determine that a particular rule relating to policy limits should be selected when the elements within modified data set 144 discuss a particular policy limit. Similarly, a particular rule relating to types of protection may be selected when elements within modified data set 144 indicate types of protection. In some cases, gap finder module 156 may receive elements within modified data set 144 and/or target data 124 and make calculations using an arithmetic logic unit within computing device 104. In some cases, gap finder module 156 may calculate the value of a user's assets, the total policy limits, the protection of the limits and the like. In some cases, gap finder module 156 may further calculate insurance coverages associated with the asset and make determinations as a function of the calculations. For example, processor 108 may calculate or determine that a particular asset is worth 10,000$ but the insurance coverage on the asset only covers 8,000$. In some cases gap finder module 156 may include web crawlers, wherein the web crawler may be configured to parse the internet for pricing of assets indicated within target data 124. For example, web crawler may be configured to retrieve an estimate of the target's property using estimates from one or more property websites. Similarly, web crawler may be configured to search the web for the price of the target's vehicles, assets, and the like. Gap finder module 156 may then be configured to compare the price of the assets to the current insurance coverage on the asset. In some cases, gap finder module 156 may determine that a particular asset within target data 124 does not contain any insurance coverage based on a lack of coverage indicated within target data 124, wherein gap finder module 156 may output a protection gap 152 indicating a lack of coverage.

With continued reference to FIG. 1, gap finder module 156 may further receive geographical datum 128 and make one or more determinations based on a user's geographical location. In some cases, gap finder module 156 may utilize a lookup table to 'lookup' coverages that are recommended within a particular geographic data. For example, wildfire insurance in an area prone to wildfires may be recommended in comparison to wildfire insurance on an island. A "lookup table," for the purposes of this disclosure, is a data structure, such as without limitation an array of data, that maps input values to output values. A lookup table may be used to replace a runtime computation with an indexing operation or the like, such as an array indexing operation. A look-up table may be configured to pre-calculate and store data in static program storage, calculated as part of a program's initialization phase or even stored in hardware in application-specific platforms. Data within the lookup table may include recommended coverages within a particular geographic area wherein processor 108 may retrieve recommended coverages by looking up the geographic datum and receiving the corresponding recommended coverages. In some cases, data within the lookup table may be populated using web crawler, wherein processor 108 may be configured to retrieve recommended coverages from one or more websites. In some cases, gap finder module 156 may compare the recommended coverages to the current coverages that a target currently has. Gap finder module 156 may then generate one or more protection gaps 152 based on protections that are indicated in the recommended protection yet not indicated within target data 124.

With continued reference to FIG. 1, gap finder module 156 may include a protection machine learning model 160. Processor 108 and/or gap finder module 156 may use a machine learning module, such as a protection machine learning module for the purposes of this disclosure, to implement one or more algorithms or generate one or more machine-learning models, such as a protection machine learning model 160, to calculate at least one protection gap 152. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from a database, such as any database described in this disclosure, or be provided by a user. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements. A machine learning module, such as protection module, may be used to create protection machine learning model 160 and/or any other machine learning model using training data. coverage machine learning model may be trained by correlated inputs and outputs of training data. Training data may be data sets that have already been converted from raw data whether manually, by machine, or any other method. Protection training data 164 may be stored in a database. Protection training data 164 may also be retrieved from database. In some cases protection machine learning model 160 may be trained iteratively using previous inputs correlated to previous outputs. For example, processor 108 may be configured to store data set 120 from current iteration and one or more protection gaps 152 to train the machine learning model. In some cases, the machine learning model may be trained based on user input 168. For example, a user may indicate that one or more protection gaps 152 are inaccurate wherein the machine learning model may be trained as a function of the user input 168. In some cases, the machine learning model may allow for improvements to computing device 104 such as but not limited to improvements relating to comparing data items, the ability to sort efficiently, an increase in accuracy of analytical methods and the like.

With continued reference to FIG. 1, in one or more embodiments, a machine-learning module may be generated using training data. Training data may include inputs and corresponding predetermined outputs so that machine-learning module may use the correlations between the provided exemplary inputs and outputs to develop an algorithm and/or relationship that then allows machine-learning module to determine its own outputs for inputs. Training data may contain correlations that a machine-learning process may use to model relationships between two or more categories of data elements. The exemplary inputs and outputs may come from a database, such as any database described in this disclosure, or be provided by a user such as a prospective employee, and/or an employer and the like. In other embodiments, machine-learning module may obtain a training set by querying a communicatively connected database that includes past inputs and outputs. Training data may include inputs from various types of databases, resources, and/or user inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements.

With continued reference to FIG. 1 determining one or more protection gaps 152 may include receiving protection training data 164 comprising a plurality of target data 124 correlated to a plurality of protection gaps 152. In some cases, the plurality of target data 124 may include target data 124 of previous iterations that have been correlated to protection gaps 152 of previous iterations. In some cases, a user may input one or more target data 124 correlated to one or more protection gaps 152 to being the machine learning process, wherein processor 108 may be configured to retrieve target data 124 of future iterations and corresponding protection gaps 152 to be used as training data to train machine learning model. In some embodiments, protection training data 164 may be received from a user, third party, database, external computing devices 104, previous iterations of processing, and/or the like as described in this disclosure. protection training data 164 may further be comprised of previous iterations of protection gaps 152. Protection training data 164 may be stored in a database and/or retrieved from a database. In some cases, determining one or more protection gaps 152 includes training protection machine learning model 160 as a function of protection training data 164 and determining one or more protection gaps 152 as a function of the protection machine learning model 160.

With continued reference to FIG. 1, in some embodiments, protection training data 164 may be iteratively updated using feedback. Feedback, in some embodiments, may include user feedback. For example, user feedback may include a rating, such as a rating from 1-10, 1-100, −1 to 1, "happy," "sad," and the like. In some embodiments, user feedback may rate a user's satisfaction with the identified protection gap 152. In some embodiments, feedback may include outcome data. "Outcome data," for the purposes of this disclosure, is data including an outcome of a process. As a non-limiting example, outcome data may include information regarding whether a target made a purchase, whether a target has continued communications, and the like. Iteratively updating protection training data 164 may include removing sets of target data 124 and protection gaps 152 from protection training data 164 as a function of negative or unfavorable feedback. In some embodiments, each set of target data 124 and protection gaps 152 within protection training data 164 may have an associated weight. That weight may be adjusted based on feedback. For example, the weight may be increased in response to positive or favorable feedback, while the weight may be decreased in response to negative or unfavorable feedback.

With continued reference to FIG. 1, in some cases, determining one or more protection gaps 152 may include sorting the modified data set 144 into one or more protection categorization 172 and determining the one or more protection gaps 152 as function of the sorting. "Protection categorization" for the purposes of this disclosure is a grouping of elements within target data 124 based on the protection required. For example, personal items may require one type of insurance coverage, property and land may require another form of coverage, cars may require another form of coverage and the like. Similarly, employing domestic staff may require a differing form of coverage such as vehicle insurance. In some cases, protection categorization 172 may include groupings such as, personal items, vehicles, property, persons (e.g. life insurance for a target, workers compensation insurance for a worker, slip and fall insurance for a guest and any other insurance that may be used to cover damages that occurred to an individual) and the like. In some cases, each protection categorization 172 may be configured to satisfy a particular category of insurance that may help protect the assets of a target. This may include, but is not limited to, property insurance (e.g. properties insured from accidents such as flooding, fires, tornadoes etc.), liability insurance (e.g., damages occurred to another individual as a result of the target's negligence) and reputation insurance (e.g. risks associated with cyber-attacks, risks associated with a target's business, risks associated with employing domestic staff etc.). In some cases, processor 108 may receive a spreadsheet wherein protection categorization 172 comprises a column or row in the spread sheet and elements within the protection categorization 172 are placed within the appropriate row or column. In some cases, processor 108 may select a particular row or column associated with a particular categorization and make one or more determinations based on each row. In some cases, processor 108 and/or gap finder module 156 may use a lookup table to lookup a particular element wherein the presence of an element on the lookup table may indicate a particular protection gap 152. For example, a particular protection categorization 172 may include elements such as a bike, a motor vehicle, etc., wherein the absence of a bike on the lookup table may indicate that a protection gap 152 does not exist whereas the presence of a motor vehicle on the lookup table may indicate that a protection gap 152 does exist. In some cases, one or more protection gaps 152 may be associated with one or more protection categorizations 172 wherein the presence of an element within a particular protection categorization 172 may indicate to processor 108 to generate a protection gap 152 associated with said particular protection categorization 172. Protection categorization may include property. Protection categorization may include reputation. Protection categorization may include liability. For example, the presence of an element within a vehicle protection categorization 172 may indicate to processor 108 to generate one or more protection gaps 152 associated with the vehicles grouping.

With continued reference to FIG. 1, gap finder module 156 may classify elements of data set 120 and/or modified data set 144 to one or more protection categorization 172 using a protection classifier. A protection classifier may be configured to receive as input modified data and categorize components of modified data set 144 to one or more protection categorizations 172. In some cases, processor 108 and/or computing device 104 may then select any elements within modified data set 144 containing a similar label and/or grouping and group them together. In some cases, modified data set 144 may be classified using a protection machine learning model 160. In some cases protection machine learning model 160 may be trained using protection training data 164 correlating a plurality of modified data sets 144 correlated to a plurality of protection categorizations 172. In an embodiment, a particular element within modified data set 144 may be correlated to a particular protection categorization 172. In some cases, classifying modified data set 144 may include classifying modified data set 144 as a function of the protection machine learning model 160. In some cases protection training data 164 may be generated through user input 168. In some cases, protection machine learning model 160 may be trained through user feedback wherein a user may indicate whether a particular element corresponds to a particular protection categorization 172. In some cases, protection machine learning model 160 may be trained using inputs and outputs based on previous iterations. In some cases, a user may input previous modified data sets 144 and corresponding protection categorizations 172 wherein protection machine learning model 160 may be trained based on the input. Protection training data 164 may be generated or received in any way as described in this disclosure. In some cases, gap finder module 156 and/or processor 108 may determine the presence of one or more elements within a particular protection categorization 172 and generate one or more protection gaps 152 that are associated with the protection categorization 172. In some cases, gap finder module 156 may receive one or more classified elements and output them as one or more protection gaps 152. For example, gap finder module 156 may indicate that a particular vehicle that has been categorized to a vehicle category requires some sort of insurance coverage. In some cases, the presence of a classified element may indicate that a protection gap 152 may exist. For example, the presence of a watch or a vehicle within a protection categorization 172 may indicate that protection may be needed on the watch or vehicle. In some cases, each protection categorization 172 may contain its own corresponding lookup table wherein a particular element within the lookup table may indicate a particular protection gap 152. For example, processor 108 may receive an element within a vehicle category and use a lookup table associated with the vehicle category to determine a corresponding protection gap 152. If the element exists on the lookup table, then processor 108 and/or gap finder module 156 may select the protection gap 152 associated with the element. If not, then gap finder module 156 may not return a protection gap 152 for that element. In some cases, the lookup table may include elements that generally require protection wherein gap finder module 156 may determine that an element requires protection if it is present on the lookup table. In some cases, processor 108 and/or gap finder module 156 may be configured to receive a response from a user of one or more elements that have been classified and may require protection based on one or more lookup tables. For example, processor 108 may generate a question to ask a user if a particular vehicle that has been classified currently contains insurance coverage. If the user answers yes, then processor 108 does not generate a protection gap 152. If however, the user inputs 168 that the particular element does not have protection, then processor 108 may generate a protection gap 152.

With continued reference to FIG. 1, gap finder module 156 may further include a chatbot configured to ask one or more gap finder questions. "Gap finder questions" for the purposes of this disclosure are a series of questions or statements wherein a particular response to the questions may indicate one or more protection gaps 152 associated with the target. In some cases, each statement may be associated with a particular protection gap 152, wherein gap finder module 156 may be configured to generate a protection gap 152 for every negative response. For example, processor 108 may generate a particular protection gap 152 if a user answers 'no' to a particular statement or response. In another non-limiting example, gap finder module 156 and/or processor 108 may be configured to generate five protection gaps 152 when a user gives a negative response to five gap finder questions. In some cases, each question may contain a correlated protection gap 152 wherein a negative response may generate a correlated protection gap 152. Gap finder questions may include, but is not limited to, questions such as "All properties are insured to their current replacement cost, including additional structures?", "Policies checked for water back-up, equipment breakdown, loss assessment, service lines protection?", "Valuables and collections have been insured to the risk tolerance of the client?", "Deductibles across properties are consistent and appropriate?", Flood protection has been offered?", "Vehicles titled in the client's personal name are insured to correct values and deductibles?", Recreational vehicles, watercraft, and aircraft are insured to correct values and deductibles?", "Property ownership has been confirmed and protection has been extended to trusts and LLCs?", "Residences are insured with the proper liability limit and on the correct protection form?", "Landlord and home sharing risks have been verified and covered?", "Vehicle ownership, household members, and drivers have been verified?", and the like. In some cases, gap finder questions may be associated with one or more protection categorizations 172 wherein gap finder module 156 is configured to generate one or more gap finder questions based on the presence of one or more elements categorized to a particular protection categorization 172. For example, gap finder module 156 may be configured to ask questions associated with vehicle coverage when at least one element within target data 124 and/or modified data set 144 is associated to a vehicle protection categorization 172. In one or more embodiments, the chatbot may be configured to define terms for a user and/or target. For example, a target may input a query into chatbot asking what a particular term means wherein chatbot may be configured to define the terms. In one or more embodiments, the chatbot may provide visual aid, tool tips, and videos in order to define complex terms and help an individual understand one or more terms. In one or more embodiments, chatbot may utilize a machine learning model, such as any machine learning model as described in this disclosure wherein training data may be used to generate outputs that can educate individuals on complex terms. In one or more embodiments, training data may include previous inputs by previous individuals into the chatbot and outputs that provide visual aid, videos, and the like. In an embodiment, each input by a user into chatbot may be used to train the machine learning model wherein responses such as "I still don't understand" by the individual may indicate that a particular term requires more a more precise definition. In one or more embodiments, user input into chatbot system may be used to train the machine learning model wherein chatbot may be configured to provide more accurate results on every iteration. In one or more embodiments, training of the machine learning model, and as a result training chatbot, may allow for quicker and more efficient communication between chatbot and an individual. In an embodiment, training data may allow for shorter communications with chatbot, and as result, less strain on one or more computing devices configured to generate chatbot.

With continued reference to FIG. 1, processor 108 is further configured to generate one or more target profiles 176 as a function of the modified data set 144, the one or more protection gaps 152, and user input 168. A "target profile," for the purposes of this disclosure, is information about a particular target who has expressed an interest a protective plan or who has expressed an interest in continued communication with a user. In some embodiments, a protective plan may include an insurance plan. "User" for the purposes of this disclosure is an individual associated with generating target profiles 176 for one or more targets. User may include a financial advisor, an insurance agent, a $3^{rd}$ party, an operator, and the like. Target profile 176 may include gaps in a targets' current coverage and contain corresponding insurance plans to address those gaps. In some cases, target profile 176 may include one or more elements of target data 124 such as a targets' background information, assets associated with the target and the like. In some cases, target profile 176 may further include financial information associated with the target such as information used for processing one or more payments (e.g. credit cards, banking information, and any other information used for digital payments). In some cases, financial information may be generated based on user input 168. For example, a user may input financial information into target profile 176. In some cases, a user may communicate with a target and receive financial information wherein a user may input the information through a user interface.

With continued reference to FIG. 1, target profile 176 may further include a stewardship file 180. A "stewardship file," for the purposes of this disclosure, is a collection of information regarding a target's assets or liabilities and the corresponding coverage associated with those assets or liabilities. For example, stewardship file 180 may include information about a vehicle and a corresponding insurance coverage of the vehicle. Similarly, stewardship file 180 may include information about a target's property and corresponding insurance coverage of the property. In some cases, stewardship file 180 may include any element within target data 124 and/or modified data set 144 associated with one or more protection gaps 152. In some cases, stewardship file 180 may include one or more protection gaps 152 determined above. In some cases, each protection gap 152 may contain a corresponding insurance plan wherein stewardship file 180 may include the corresponding insurance plans. In some cases, stewardship file 180 may include one or more images of elements associated with assets described within the target data 120 and the insurance plan associated with the images. For example, stewardship file 180 may include an image of a vehicle and a corresponding insurance coverage. In one or more embodiments, stewardship file 180 may include updates on particular trends within a geographic area, any current insurance claims the target has, and/or personalized advice received from one or more ally's and/or insurance agents. In one or more embodiments, processor may utilize chatbot as described above to receive prompts regarding any elements within stewardship file 180 wherein chatbot may be configured to define terms and assist within one or more generated elements within stewardship file 180. In some cases, stewardship file 180 may include a personalized, digital (including video) report containing an update of how current trends are affecting their insurance situation, highlights of their insurance program, their 5-year claim and motor vehicle history, premium analysis, and recommendations for their insurance renewal. In one or more embodiments, stewardship file 180 may provide an engaging insurance experience while preventing coverage gaps from occurring. In one or more embodiments, stewardship file 180 may include modification and/or updates periodically based on changes in the target's situation as indicated by an input of data, by a modification of target data and/or market conditions. In one or more embodiments, processor 108 may be configured to generate personalized alerts based on elements within stewardship file 180 and/or updates made to stewardship file 180. For example, if stewardship file 180 identifies a potential coverage gap, the target or an individual associated with stewardship file 180 may receive an alert with a recommendation on how to address it. In one or more embodiments, processor may be configured to receive updated situations associated with a target, such as updated trends, changes to target data 124 and the like. In one or more embodiments, changes may be retrieved by a web crawler or through user input. In one or more embodiments, processor may receive stewardship file 180 and generate updated protection gaps, customization modules and the like. In one or more embodiments, changes to stewardship file 180 may be used to forecast potential changes in the client's insurance situation based on trends and data, such as climate and weather conditions, reconstruction costs, and changes in insurers' underwriting practices. This may provide a target with valuable foresight and help them make informed decisions. In one or more embodiments, stewardship file 180 may include images, wherein the images may be retrieved from target data 120 wherein a particular asset contains a corresponding image. In some cases, the images may be retrieved and/or associated with one or more customization modules 184. In some cases, processor 108 may generate a stewardship file 180 by receiving a plurality of customization modules 184 from a database. A "customization module" for the purposes of this disclosure is information about a particular insurance coverage that is associated with one or more protection gaps 152. For example, a customization module 184 may include insurance protection for a car, a boat, a house, employees and the like. In some cases, each customization module 184 may further include a corresponding value of the coverage. For example, a customization module 184 may indicate that a particular insurance coverage covers up to 10,000$ of damages while another customization module 184 may indicate that the particular insurance coverage covers up to 30,000$ in damages. In some cases, each customization module 184 may be associated with a particular protection gap 152. For example, a protection gap 152 indicating that a target may require flood insurance may be associated with a customization module 184 describing flood insurance. In an embodiment, a customization module 184 may be used to help a target purchase a particular insurance coverage to satisfy the needs of the protection gap 152. In some cases, more than one customization modules 184 may be associated to a particular protection gap 152, wherein a target or user may select from one or more customization modules 184 for a particular protection gap 152. In some cases, processor 108 may be configured to receive a plurality of customization modules 184 form a database and select one or more customization modules 184 that are associated with one or more protection gaps 152. Additionally or alternatively, processor 108 may be configured to select a customization module 184 as a function of the one or more protection gaps 152. In some cases, processor 108 may determine the presence of one or more protection gaps 152 and select one or more customization modules 184 that are associated with the one or more protection gaps 152. In some cases, processor 108 may use a lookup table to lookup associated customization modules 184 with each protection gap 152. In some cases, a user may populate the lookup table or database with customization modules 184. In some cases, each customization module 184 may be associated with a particular geographic location. For example, a customization module 184 description insurance coverage for California may be different than a customization module 184 describing insurance coverage for Oregon. In some cases, each customization module 184 may be associated with a particular geographic location wherein processor 108 may select a customization module 184 as a function of the geographical datum 128 within target data 124. In some cases, stewardship report may include images of element associated with a protection gap 152 and a corresponding customization module 184. For example, stewardship report may include images of a watch and a corresponding customization module 184 describing the insurance coverage associated with the watch. In some cases, stewardship report may further include insurance claims associated with each element. "An insurance claim" for the purposes of this disclosure is a demand made to an insurance company for reimbursement of losses incurred due to damages to a person or asset. In some cases, insurance claims may be retrieved from target data 124. In some cases, insurance claims may further be retrieved through user input 168 wherein a user may continuously update stewardship file 180 with updates claims. In some cases, data within target profile 176 and/or stewardship report may be retrieved from a customer relationship management (CRM) software. Customer relationship management software is software used for managing an entity's relationships and interactions with clients, targets and/or potential targets. In some cases, stewardship file 180 may include recommendations for a target, such as recommendations to switch insurance plans, upgrade an existing plan and the like. In some cases, processor 108 may generate recommendations by comparing an existing customization module 184 to a plurality of customization modules 184 and recommending a new customization module 184 if the new customization module 184 may contain better insurance coverage or a better rate. For example, processor 108 may recommend a new customization module 184 when the existing customization module 184 contains similar protection yet costs more. Similarly, processor 108 may recommend a new customization module 184 if the new customization module 184 cover a higher loss of damages in comparison to the existing customization module 184. In some cases, stewardship file 180 may include a generated video recommendation wherein the generated video recommendation is created by the user or one associated with the user and uploaded through user input 168 to the stewardship file 180. In some cases, stewardship file 180 may include information and/or visual elements depicting a target's cost of insurance premiums over a given particular period. This data may be retrieved from target data 124 and/or through user input 168. In some cases, the stewardship file 180 may include the average cost of premiums within a given geographical area, wherein processor 108 may configure a web crawler to retrieve the historical prices of insurance premiums within a given area. In some cases, each customization module 184 and/or stewardship file 180 may contain current market conditions and trends. For example, a particular customization module 184 may include a particular insurance plan based on a particular insurance plan that is cheaper. In some cases, each customization module 184 may further include recommendations for plans based on geographic trends such as incidences of wildfires, incidences of break-ins in the area, incidences of car accidents and the like. In an embodiment, a particular customization module 184 may ensure that an individual is covered based on incidences that occur within a particular geographic region. In some cases, each customization module 184 may be associated with a particular geographic region wherein processor 108 may select customization modules 184 associated with the particular geographic region. In some cases, each customization module may include videos about the current plan that is being covered. The videos may include videos describing a particular plan, videos describing why a particular plan is more expensive, a video on why the particular plan has gone up in pricing and the like. In some cases, each customization module 184 may contain an associated generated video wherein the video may be added to stewardship file 180. In one or more embodiments, various videos may be selected and reflected within stewardship file 180. In some cases, a user may upload one or more videos to each customization module 184 wherein a particular customization module may include a corresponding informative video. In some cases, each stewardship file may include one or more videos associated a customization module wherein selection of a customization module may indicate selection of a particular video. In an embodiment, a target may be informed about the particular customization module, information associated with pricing and the like.

With continued reference to FIG. 1, in some cases, stewardship file 180 may be generated more than once and one more than one particular occasion. For example, processor may generate stewardship file weekly, monthly, yearly and the like. In some cases, a particular target data 124 may be stored on a database and updated continuously by a user. In some cases, processor 108 may be configured to generate stewardship file after each input by a user. For example, a user may input an additional asset within target data wherein processor may be configured to generate an updated stewardship file based on the addition of the asset. Similarly, target data 124 may be modified to include updated contact information, updated places of residency and the like wherein processor may be configured to generate an updated stewardship file 180. In some cases, processor 108 may be configured to generate an updated stewardship file 180 as a function of one or more event handlers (described in further detail below). In some cases, the event handlers may be triggered based on input, based on a particular time frame, based on the expiration of a particular insurance coverage within target data and/or any other significant events that may require the updated for stewardship file 180.

With continued reference to FIG. 1, in some cases, each customization module 184 may include an image associated with the particular asset that requires coverage. For example, customization module 148 may include an image of a boat in instances when a particular customization module contains information about a corresponding insurance plan or coverage plan for the boat. In some cases, images from customization module may be retrieved from a database of image. In some cases, processor may utilize a webcrawler to retrieve a particular image by searching for the image on the web. In some cases, processor 108 may receive the images from customization module 184 to be used in stewardship file.

With continued reference to FIG. 1, stewardship file 180 may further include future meetings between the user and the target. Stewardship file 180 may further include any information that may be used to contact the target such as an email, a phone number, a physical address and the like. In some cases processor 108 may be configured to retrieve one or more elements within stewardship file 180 through a user interface, such as for example, through receipt of selecting one or more buttons on the user interface and the like as described below.

With continued reference to FIG. 1, target profile 176 may include a risk report file 188. "Risk report file" for the purposes of this disclosure is information associated with one or more protection gaps 152. For example risk report file 188 may include information as to why a particular vehicle requires coverage. Similarly, risk report file 188 may include information as to why a particular protection gap 152 needs to be addressed. For example, risk report file 188 may include information indicating why a user's property requires a particular type of insurance. In some cases, risk report file 188 may further include recommendations for particular customization modules 184. For example, risk report file 188 may include one or more customization modules 184 wherein a target may be able to view the customization modules 184 and select the modules that best suit their needs. In one or more embodiments, risk report file 188 may include visualizations and/or interactive elements wherein an individual may interact with the elements to select one or more customization modules 184 and/or to modify one or more customization modules or any data within risk report file 188. In one or more embodiments, processor 108 may display risk report file 188 on a user interface such as any user interface as described in this disclosure wherein an individual may interact with elements of risk report file 118, wherein modification of elements with risk report file 188 may result in further processing. In one or more embodiments, a user may interact with risk report file wherein interaction may indicate a selection of one or more customization modules. For example, user interface may visualize a sliding scale wherein a sliding of the sliding scale may indicate a selection of a particular customization module 184. Continuing, a left hand of sliding scale may be associated with a customization module 188 with a lower cost whereas a right hand of the sliding scale may be associated with a customization module of higher cost. In some cases, risk report file 188 may be generated by the user through user input 168. In some cases each protection gap 152 may include corresponding information as to why the protection gap 152 needs to be resolved. For example a protection gap 152 may indicate that a target does not have fire insurance. The protection gap 152 may further indicate that fires are high within a given geographic location and/or that fires are quite common and therefore insurance is needed. Processor 108 may retrieve the information as to why each protection gap 152 needs to be resolved and input it into the risk report file 188. In some cases each protection gap 152 may be associated with information about the protection gap 152 wherein processor 108 may retrieve the information (e.g. through a lookup table, from a database etc.) and input them into lifestyle risk report. In some cases, lifestyle risk report may include recommendations for one or more customization modules 184. For example, processor 108 may indicate that a user select a particular customization module 184 in order to purchase a particular insurance plan to address a protection gap 152. In some cases, each protection gap 152 may be associated with one or more customization modules 184 wherein a user may select a particular customization module 184 for each protection gap 152. In some cases, processor 108 may recommend customization modules 184 based on pricing, wherein a cheaper customization module 184 may be recommended over a more expensive one. In some cases, processor 108 may further make recommendations based on the protection of each recommendation module, the costs, and the like.

With continued reference to FIG. 1, target profile 176 may be generated as function of user input 168. In some cases user input 168 may include any indication that a target is interested in communicating with client wherein processor 108 may generate a target profile 176 as a function of the indication. For example, processor 108 may receive a 'yes' or 'no' wherein a yes may indicate to generate a target profile 176 based on the target data 124 and a no may indicate to not generate a target profile 176 based on target data 124. In some cases, a user may interact with multiple targets and input into processor 108 the user's interactions with the clients. Processor 108 may then generate one or more target profiles 176 as function of the user input 168. In some cases, user input 168 may include a score card 148. A "Score card" for the purposes of this disclosure is information regarding communication with a target. For example, user may communicate with a target and generate a score card 148 summarizing the interaction. In some cases, score card 148 may include one or more scores based on the interaction with the target. This may include a score associated with the target's tone, a score associated with the target's interest, a score associated with the target's communicative skills and the like. In some cases, a user may input score card 148 wherein processor 108 may determine whether a particular target profile 176 should be created based on the scores on the score card 148. For example, a score card 148 may include low ranking scores associated wherein processor 108 may determine that a target is not fit for generation of a target profile 176. Similarly, a score card 148 may indicate higher scores wherein processor 108 may determine that a target is fit for generation of a target profile 176. In some cases, processor 108 may determine what scores may be suitable by comparing each score to a known threshold, by comparing an average of the scores to a threshold, by comparing the sum of the scores to a threshold and the like. In some cases, score card 148 may further include any information needed for generation of a target profile 176. This may include updated contact information, financial information, additional assets not originally listed in target data 124 and any other data that may be needed to properly generate a target profile 176.

With continued reference to FIG. 1, generating target profile 176 may further include generating target profile 176 using a target machine learning model. Generating target profile 176 using target machine learning model may include receive target training data containing a plurality of target data 124 and/or protection gaps 152 associated with a plurality of target profiles 176, stewardship files 180 and/or risk report files 188. In some cases, the plurality of target data 124 may include target data 124 of previous iterations that have correlated target profiles 176 or elements thereof. In some cases, a user may input one or more target data 124 correlated to one or more target profiles 176 into the machine learning process, wherein processor 108 may be configured to retrieve target profiles 176 of future iterations and corresponding elements thereof to be used as training data to train target machine learning model. In some embodiments, target training data may be received from a user, third party, database, external computing device 104s, previous iterations of processing, and/or the like as described in this disclosure. Target training data may further be comprised of previous iterations of target profiles 176, protection gaps 152 and target data 124. Target training data may be stored in a database and/or retrieved from a database. In some cases, generating one or more target profiles 176 includes training target machine learning model as a function of target training data and generating one or more protection gaps 152 as a function of the target machine learning model.

With continued reference to FIG. 1, target profile 176 and/or any elements thereof may be generated by one or more allies. An "Ally" for the purposes of this disclosure is an individual associated with user who may be tasked with generating target profile 176 or one or more implementations thereof to select from. In some cases, an ally may be a financial advisor, an insurance agent or an entity associated with financial and insurance planning. In some cases, processor 108 may be configured to transmit one or more protection gaps 152 and/or target data 124 to one or more allies, wherein each ally of the one or more allies may communicate and/or generate a particular target profile 176 or elements thereof. For example, a first ally may generate one or more customization modules 184 each addressing one or more protection gaps 152 whereas a second ally may generate one or more differing customization modules 184 to address one or more protection gaps 152. In some cases, a user may generate risk report files 188 with one or more customization modules 184 generated by the one or more allies. Additionally, or alternatively, a target may select the customization modules 184 that seem like the best fit. In some cases processor 108 may use an ally module to communicate with one or more allies. An "ally module" for the purposes of this disclosure is a software configured to communicate with one or more allies and generate one or more target profiles 176. In some cases, ally module may include a software in which a user may communicate with one or more allies through text conversations, video conversations, audio conversations, the transmission of digital files and the like. In some cases ally module may include a certification process wherein an individual must first be certified prior to becoming an ally. The certification process may include background checks and the signing of nondisclosure agreements. In some cases, a user or an entity associated with the user may select one or more individuals to be identified as allies. In some cases a user may input one or more target data 124 and the associated one or more protection gaps 152 into ally module wherein one or more allies may receive the target data 124 and protection gaps 152 and provide exemplary target profiles 176 to be selected from.

With continued reference to FIG. 1, in some cases processor 108 may be configured to transmit the plurality of origination datum 132 to one or more origination files 192. In some cases, processor 108 may be configured to transmit the origination datum 132 of only target data 124 within modified data set 144. In some cases, processor 108 may be configured to transmit the origination datum 132 of only target data 124 that has an associated target profile 176. An "origination file" for the purposes of this disclosure is a data file containing information associated with the originator responsible for generating data set 120 as indicated within organization datum 132. For example, organization datum 132 may identify a particular originator as the person who was responsible for generating one or more elements within target data 124 set 120. As a result, computing device 104 each origination file 192 may contain the information of the originator and the corresponding targets data sets 120 and/or elements thereof that the originator is responsible for generating. In some cases, origination file 192 may include information indicating one or more target data 124 that has been generated by the originator. In some cases, origination file 192 may further include information that one or more target profiles 176 has been generated as a function of the originator's target data 124. In some cases, an origination file 192 may include the information of the originator, the amount of target data 124 that was created by the originator, the amount of target profiles 176 that were created as a result, and the like. In some cases, processor 108 may tabulate the amount of target data 124 generated by the originator through the origination datum 132 received by each origination file 192. For example, an origination file 192 containing five origination datum 132 may indicate that an originator was responsible for generating five target data 124. In some cases, one or more origination files 192 may be located on a database. In some cases, the originator may include a financial advisor, an employee, the user, an individual associated with the user and the like. In some cases, one or more origination files 192 may be used to incentivize or to track the activity of one or more originators.

With continued reference to FIG. 1, processor 108 may be configured to create a user interface data structure. As used in this disclosure, "user interface data structure" is a data structure representing a specialized formatting of data on a computer configured such that the information can be effectively presented for a user interface. User interface data structure may include target profile 176, one or more protection gaps 152 and any other data described in this disclosure.

With continued reference to FIG. 1, processor 108 may be configured to transmit the user interface data structure to a graphical user interface. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. Processor 108 may transmit the data described above to database wherein the data may be accessed from database. Processor 108 may further transmit the data above to a device display or another computing device 104.

With continued reference to FIG. 1, apparatus includes a graphical user interface 196 (GUI). For the purposes of this disclosure, a "user interface" is a means by which a user and a computer system interact. For example, through the use of input devices and software. In some cases, processor 108 may be configured to modify graphical user interface 196 as a function of the one or more target profiles 176 by populating user interface data structure with one or more target profiles 176 and visually presenting the one or more profiles through modification of the graphical user interface 196. A user interface may include graphical user interface 196, command line interface (CLI), menu-driven user interface, touch user interface, voice user interface (VUI), form-based user interface, any combination thereof and the like. In some embodiments, a user may interact with the user interface using a computing device 104 distinct from and communicatively connected to processor 108. For example, a smart phone, smart tablet, or laptop operated by the user and/or participant. A user interface may include one or more graphical locator and/or cursor facilities allowing a user to interact with graphical models and/or combinations thereof, for instance using a touchscreen, touchpad, mouse, keyboard, and/or other manual data entry device. A "graphical user interface," as used herein, is a user interface that allows users to interact with electronic devices through visual representations. In some embodiments, GUI 196 may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in graphical user interface 196. Persons skilled in the art, upon reviewing the entirety of this disclosure, will be aware of various ways in which a graphical user interface 196 and/or elements thereof may be implemented and/or used as described in this disclosure.

With continued reference to FIG. 1, apparatus may further include a display device communicatively connected to at least a processor 108. "Display device" for the purposes of this disclosure is a device configured to show visual information. In some cases, display device may include a liquid crystal display (LCD), a cathode ray tube (CRT), a plasma display, a light emitting diode (LED) display, and any combinations thereof. Display device may include, but is not limited to, a smartphone, tablet, laptop, monitor, tablet, and the like. Display device may include a separate device that includes a transparent screen configured to display computer generated images and/or information. In some cases, display device may be configured to visually present one or more data through the GUI 196 to a user, wherein a user may interact with the data through GUI 196. In some cases, a user may view GUI 196 through display.

With continued reference to FIG. 1, GUI 196 may be configured to visually present one or more target profiles 176 to a user. In some cases, GUI 196 may visually present one or more elements of target data 124 and corresponding insurance coverages. In some cases, GUI 196 may visually present one or more images corresponding to one or more protection gaps 152 and/or elements and information associated with the images. This may include but is not limited to, information regarding insurance coverage, information about the image itself such as the cost of the asset, the cost of the insurance associated with the asset and the like. In one or more embodiments, GUI 196 may include a forum, which may be configured to receive questions, comments and any other inputs from one or more individuals interacting with apparatus. A "forum," for the purposes of this disclosure, is a digital location where one or more users may communicate among each other. In one or more embodiments, inputs may be stored on a database wherein other individuals interacting within apparatus 100 may view inputs as well. In one or more embodiments, processor may be configured to visually present information to one or more individuals such as but not limited to, information associated with professionals in a given area, information associated with insurance coverage, information associated with assets and liabilities and the like. In an embodiment, GUI 196 may visually present information to one or more individuals wherein individual may interact and view the information.

With continued reference to FIG. 1, apparatus 100 may be communicatively connected to one or more remote devices. A "remote device," for the purposes of this disclosure, is a device that is not physically connected with apparatus 100, but is able to communicate with apparatus 100 by way of a communications network. In some embodiments, remote device may include Internet of Things (IoT) devices. An "IoT device," for the purposes of this disclosure, are devices that form a collective network of connected devices that facilitates communication between the devices. Remote devices may, as non-limiting examples, include a smartwatch, wearable, burglary alarms, thermostats, fire alarms, carbon monoxide detectors, water leak detectors, water shut off valves, electrical monitoring devices (such as for fire prevention), and the like.

With continued reference to FIG. 1, Apparatus 100 may receive a remote datum from the one or more remote devices. In some embodiments, remote datum may include an alert. For example, alert may include a crash alert. In some embodiments, crash alert may be received from a wearable, such as a smartwatch. In some embodiments, alert may include a fire alert. Fire alert may be sent if a remote device detects fire. In some embodiments, alert may include a safety alert. A safety alert. Safety alert may be sent if a remote device detects an unsafe condition, such as faulty wiring, a carbon monoxide leak, and the like. In some embodiments, apparatus 100 may display alert through GUI 196. In some cases, apparatus 100 may display remote datum through GUI 196.

Figure 2:
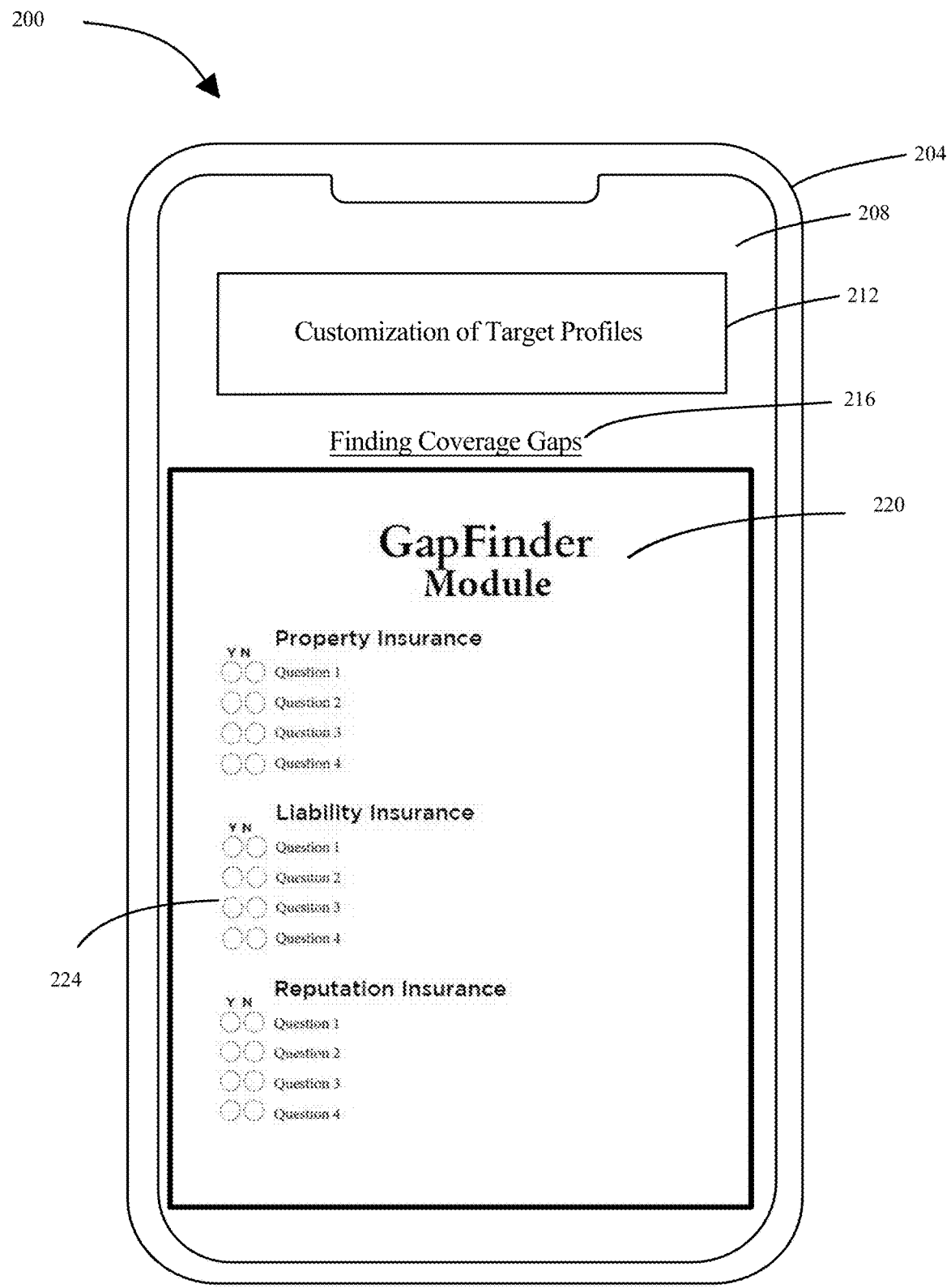
FIG. 2 is an exemplary embodiment of a graphical user interface in accordance with this disclosure.

Referring now to FIG. 2, an exemplary embodiment of a GUI 200 on a display device 204 is illustrated. GUI 200 is configured to receive the user interface structure as discussed above and visually present any data described in this disclosure. Display device 204 may include, but is not limited to, a smartphone, tablet, laptop, monitor, tablet, and the like. Display device 204 may further include a separate device that includes a transparent screen configured to display computer generated images and/or information. In some cases, GUI 200 may be displayed on a plurality of display devices. In some cases, GUI 200 may display data on separate windows 208. A "window" for the purposes of this disclosure is the information that is capable of being displayed within a border of device display. A user may navigate through different windows 208 wherein each window 208 may contain new or differing information or data. For example, a first window 208 may display information relating to the target profiles 176, whereas a second window may display information relating to the gap finder module 156 as described in this disclosure. A user may navigate through a first second, third and fourth window (and so on) by interacting with GUI 200. For example, a user may select a button or a box signifying a next window on GUI 200, wherein the pressing of the button may navigate a user to another window. In some cases, GUI may further contain event handlers, wherein the placement of text within a textbox may signify to computing device to display another window. An "event handler" as used in this disclosure is a callback routine that operates asynchronously once an event takes place. Event handlers may include, without limitation, one or more programs to perform one or more actions based on user input 168, such as generating pop-up windows, submitting forms, requesting more information, and the like. For example, an event handler may be programmed to request more information or may be programmed to generate messages following a user input 168. User input 168 may include clicking buttons, mouse clicks, hovering of a mouse, input using a touchscreen, keyboard clicks, an entry of characters, entry of symbols, an upload of an image, an upload of a computer file, manipulation of computer icons, and the like. For example, an event handler may be programmed to generate a notification screen following a user input 168 wherein the notification screen notifies a user that the data was properly received. In some embodiments, an event handler may be programmed to request additional information after a first user input 168 is received. In some embodiments, an event handler may be programmed to generate a pop-up notification when a user input 168 is left blank. In some embodiments, an event handler may be programmed to generate requests based on the user input 168. In this instance, an event handler may be used to navigate a user through various windows 208 wherein each window 208 may request or display information to or from a user. In this instance, window 208 displays an identification field 212 wherein the identification field signifies to a user, the particular action/computing that will be performed by a computing device. In this instance identification field 212 contains information stating "customization of target profiles" wherein a user may be put on notice that any information being received or displayed will be used to generate or customize target profiles 176 as described in this disclosure. Identification field 212 may be consistent throughout multiple windows 208. Additionally, in this instance, window 208 may display a sub identification field 216 wherein the sub identification field may indicate to a user the type of data that is being displayed or the type of data that is being received. In this instance, sub identification field 216 contains "finding protection gaps". This may indicate to a user that computing device is determining one or more protection gaps. Additionally, window 208 may contain a prompt 220 indicating the data that is being described in sub identification field 216 wherein prompt 220 is configured to display to a user the data that is currently being received and/or generated. In this instance, prompt 220 notifies a user that a gap finder module 156 is currently present in the current window 208. In this instance GUI may contain checkboxes 224 wherein the selection of a checkbox may indicate to computing device the receipt of information. For example, the selection of a first checkbox may indicate that a user has answered affirmatively to a particular statement wherein the selection of a second checkbox may signify that a user has answered negatively to the particular statement. In some cases, the selection of one or more checkboxes may indicate one or more protection gaps as described above.

With continued reference to FIG. 2, GUI 200 may be configured to receive user feedback. For example, GUI may be configured to generate one or more protection gaps wherein a user may interact with GUI 200 and provide feedback on the determined protection gaps. In some cases, a user may desire to view multiple protection gaps wherein a user may navigate back and forth through various windows to select one or more protection gaps and view any corresponding information associated with the protection gaps. In some cases, user feedback may be used to train a machine learning model as described above. In some cases, user feedback may be used to indicate computing device 104 to generate alternative cover gaps and/or target profiles 176. In some cases, a user may determine that a particular profile may not be desired wherein computing device 104 may determine an alternative target profile 176.

Figure 3:
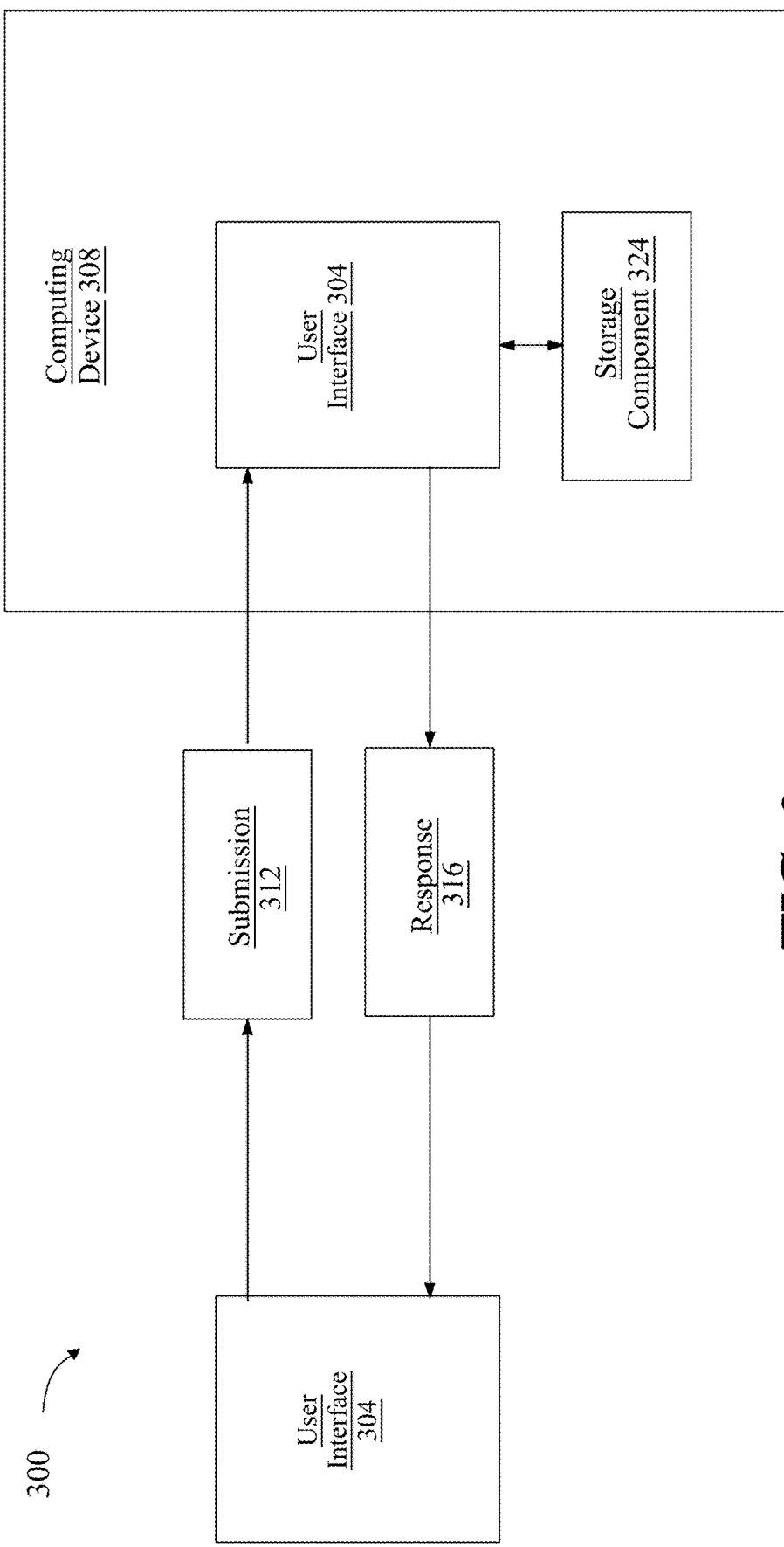
FIG. 3 is a block diagram of exemplary embodiment of a chatbot.

Referring to FIG. 3, a chatbot system 300 is schematically illustrated. According to some embodiments, a user interface 304 may be communicative with a computing device 308 that is configured to operate a chatbot. In some cases, user interface 304 may be local to computing device 308. Alternatively or additionally, in some cases, user interface 304 may remote to computing device 308 and communicative with the computing device 308, by way of one or more networks, such as without limitation the internet. Alternatively or additionally, user interface 304 may communicate with user device 308 using telephonic devices and networks, such as without limitation fax machines, short message service (SMS), or multimedia message service (MMS). Commonly, user interface 304 communicates with computing device 308 using text-based communication, for example without limitation using a character encoding protocol, such as American Standard for Information Interchange (ASCII). Typically, a user interface 304 conversationally interfaces a chatbot, by way of at least a submission 312, from the user interface 308 to the chatbot, and a response 316, from the chatbot to the user interface 304. In many cases, one or both of submission 312 and response 316 are text-based communication. Alternatively or additionally, in some cases, one or both of submission 312 and response 316 are audio-based communication.

Continuing in reference to FIG. 3, a submission 312 once received by computing device 308 operating a chatbot, may be processed by a processor 320. In some embodiments, processor 320 processes a submission 312 using one or more of keyword recognition, pattern matching, and natural language processing. In some embodiments, processor employs real-time learning with evolutionary algorithms. In some cases, processor 320 may retrieve a pre-prepared response from at least a storage component 324, based upon submission 312. Alternatively or additionally, in some embodiments, processor 320 communicates a response 316 without first receiving a submission 312, thereby initiating conversation. In some cases, processor 320 communicates an inquiry to user interface 304; and the processor is configured to process an answer to the inquiry in a following submission 312 from the user interface 304. In some cases, an answer to an inquiry present within a submission 312 from a user device 304 may be used by computing device 104 as an input to another function, such as any data described above.

Figure 4:
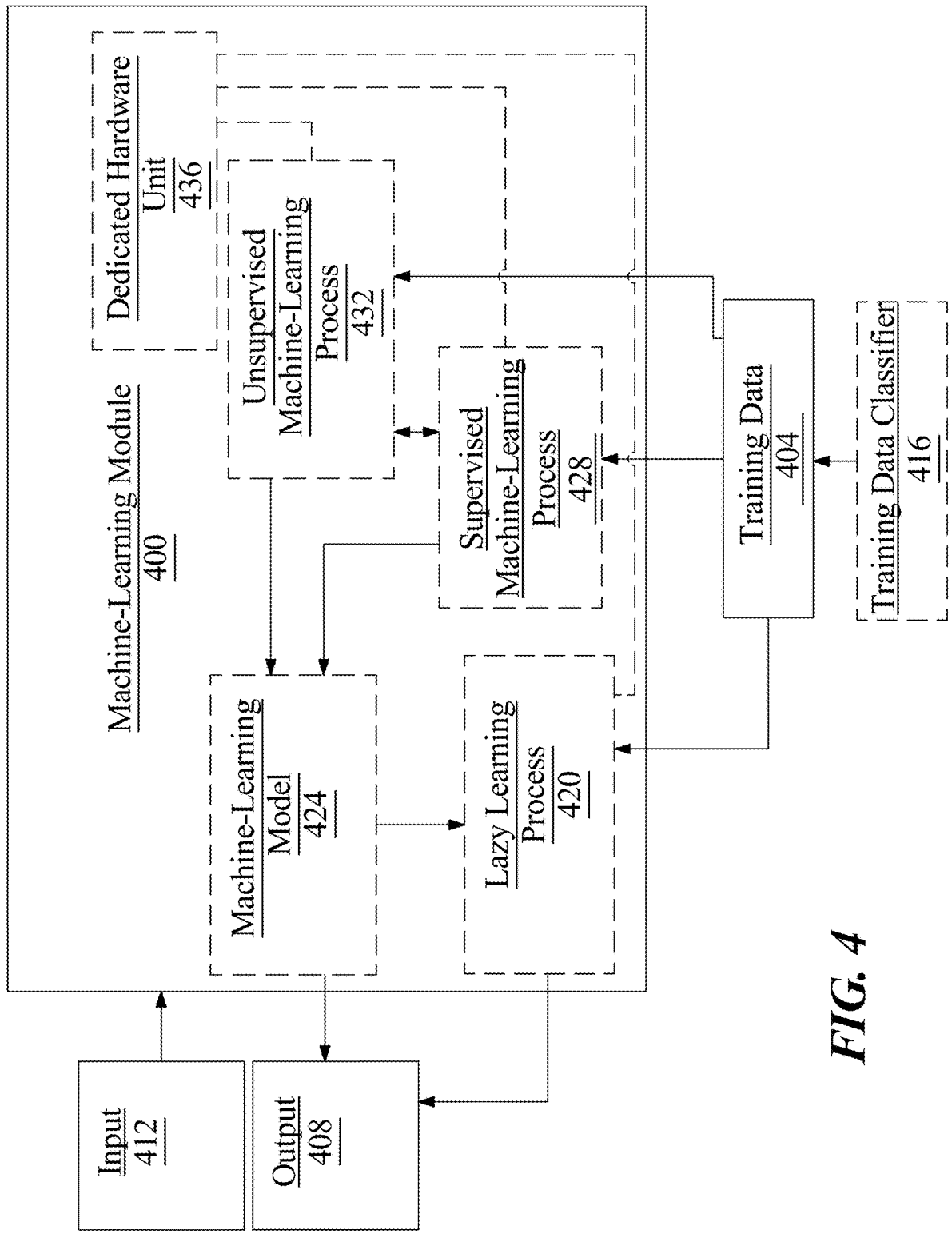
FIG. 4 is a block diagram of exemplary embodiment of a machine learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example inputs may include any inputs as described in this disclosure such as target data, and outputs may include any outputs as described in this disclosure such as protection gaps.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to classes such as one or more protection categorizations. For example, a particular element may be classified to a particular protection categorization wherein elements of training data may be correlated to elements of one or more protection gaps. In some cases, classification may allow for minimization of error within the machine learning model wherein a particular input may only be given a particular output correlated to the same class. Additionally or alternatively, a particular coverage categorization may allow for quicker processing wherein elements are first classified prior to generating a result.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may identified as having poor quality data, where "poor quality" is defined as having a signal to noise ratio below a threshold value.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include target as described above as inputs, protection gap as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
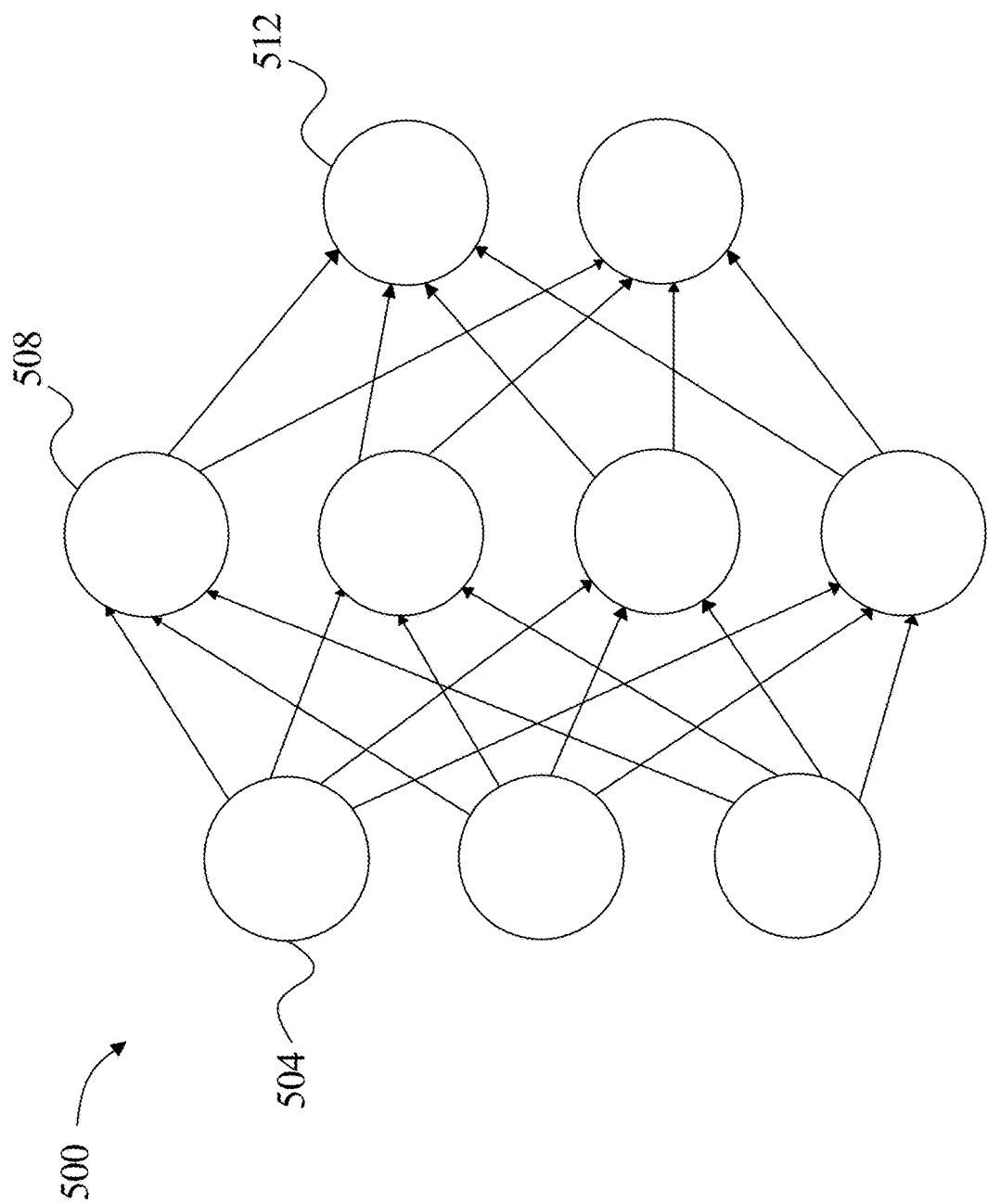
FIG. 5 is a diagram of an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
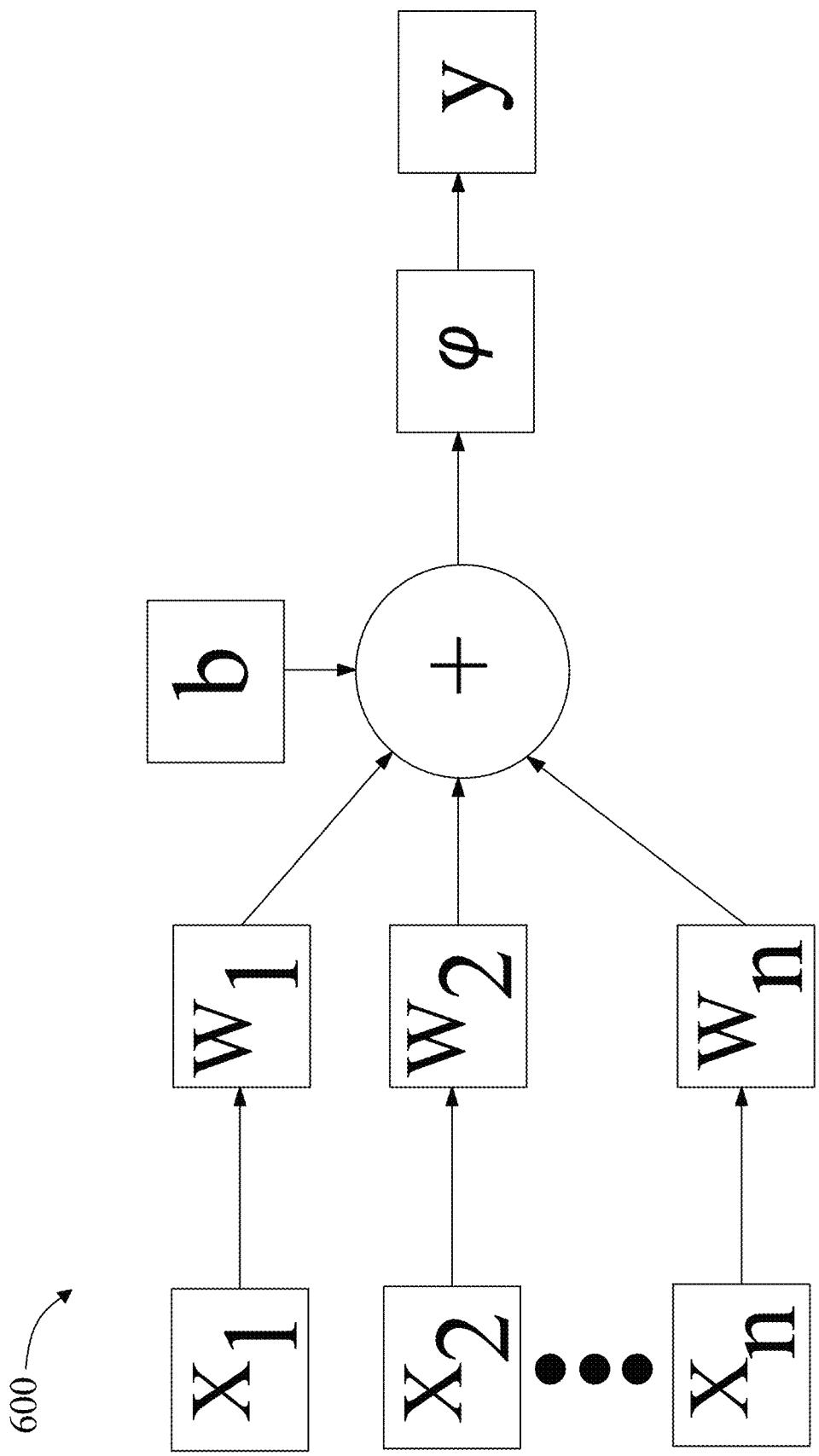
FIG. 6 is a block diagram of an exemplary embodiment of a node of a neural network.

Referring now to FIG. 6, an exemplary embodiment of a node 600 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as ƒ(x)=tanh²(x), a rectified linear unit function such as ƒ(x)=max (0, x), a "leaky" and/or "parametric" rectified linear unit function such as ƒ(x)=max (ax, x) for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as ƒ(x)=x*sigmoid(x), a Gaussian error linear unit function such as f(x)=a(1+tanh ($\sqrt{2/\pi}$(x+bx^r))) for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
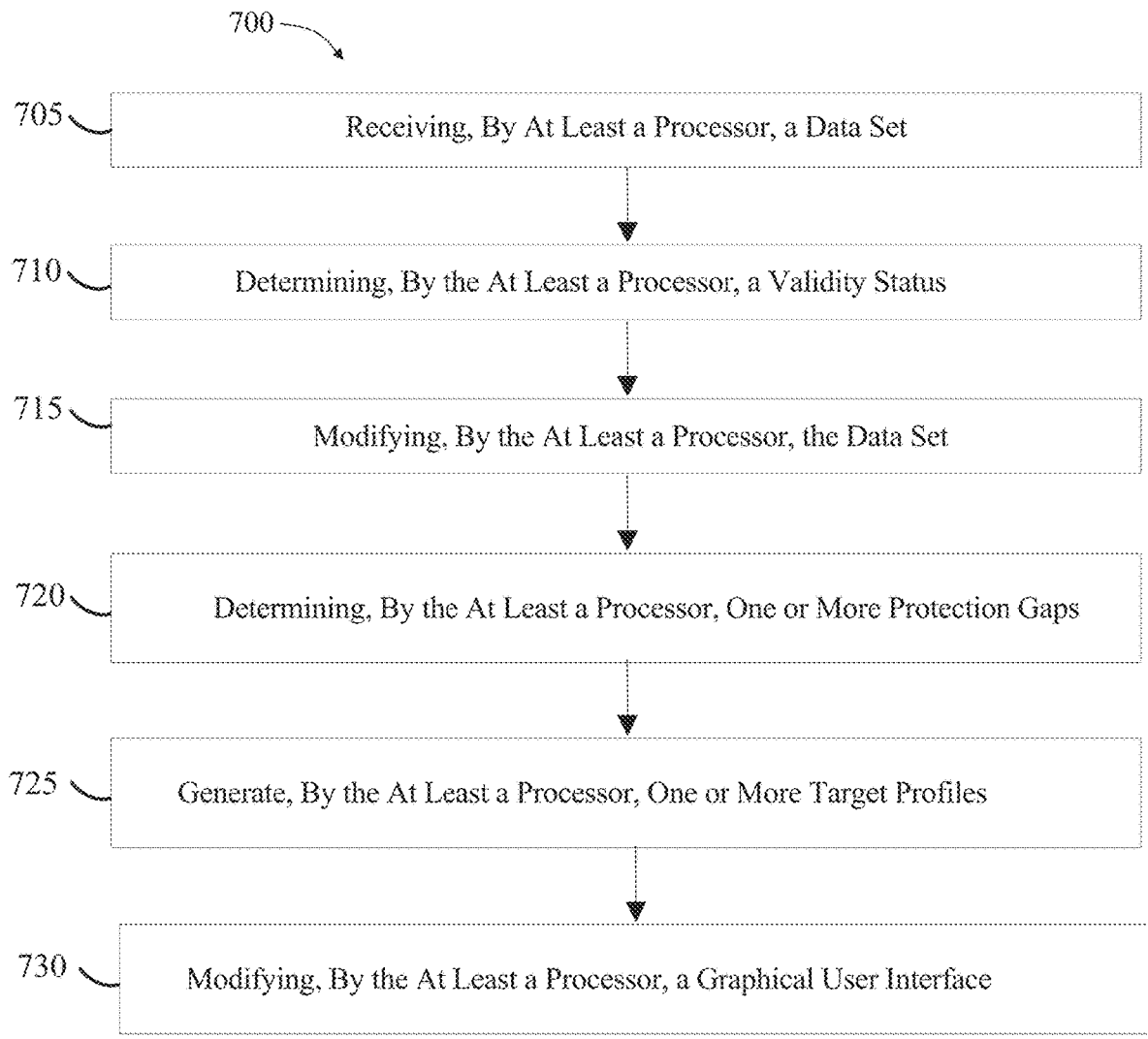
FIG. 7 is a flow diagram illustrating an exemplary embodiment of a method for customization and utilization of target profiles.

Referring now to FIG. 7, a method 700 for customization and utilization of target profiles is described. At step 705, method 700 includes receiving, by at least a processor, a data set having a plurality of target data. In some cases, each of the target data includes origination datum. In some cases, the plurality of target data includes at least a geographical datum. This may be implemented with reference to FIGS. 1-6 and without limitation.

With continued reference to FIG. 7, at step 710 method 700 includes determining, by the at least a processor, a validity status of the plurality of target data within the data set. In some cases, determining the validity status of the plurality of target data includes comparing the plurality of target data to a validity threshold. This may be implemented with reference to FIGS. 1-6 and without limitation.

With continued reference to FIG. 7, at step 715 method 700 includes modifying, by the at least a processor, the data set as a function of the validity status. This may be implemented with reference to FIGS. 1-6 and without limitation.

With continued reference to FIG. 7, at step 720 method 700 includes determining, by the at least a processor, one or more protection gaps within the modified data set using a gap finder module. determining the one or more protection gaps includes receiving protection training data having a plurality of target data correlated to a plurality of protection gap, training a protection machine learning model as a function of the protection training data, and determining one or more protection gaps as a function of the protection machine learning model. In some cases, determining the one or more protection gaps includes sorting the modified data set into one or more protection categorizations, and determining one or more protection gaps as a function of the sorting. This may be implemented with reference to FIGS. 1-6 and without limitation.

With continued reference to FIG. 7, at step 725, method 700 includes generating, by the at least a processor, one or more target profiles as function of the modified data set, the one or more protection gaps, and a user input. In some cases, generating, by the at least a processor, the one or more target profiles includes generating the one or more profiles as a function of the at least a geographical datum. In some cases, generating the one or more target profiles as function of the modified data set and the user input includes receiving a scorecard as a function of the user input. In some cases, the one or more target profiles includes a stewardship file and a risk report file. In some cases generating the stewardship file includes receiving a plurality of customization modules from a database, and selecting one or more customization modules as a function of the one or more protection gaps. This may be implemented with reference to FIGS. 1-6 and without limitation.

With continued reference to FIG. 7, at step 730 method 700 includes modifying, by the at least a processor, a graphical user interface as a function of one or more target profiles. In some cases, the method further includes transmitting, by the at least a processor, the plurality of origination datum to one or more origination files. This may be implemented with reference to FIGS. 1-6 and without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
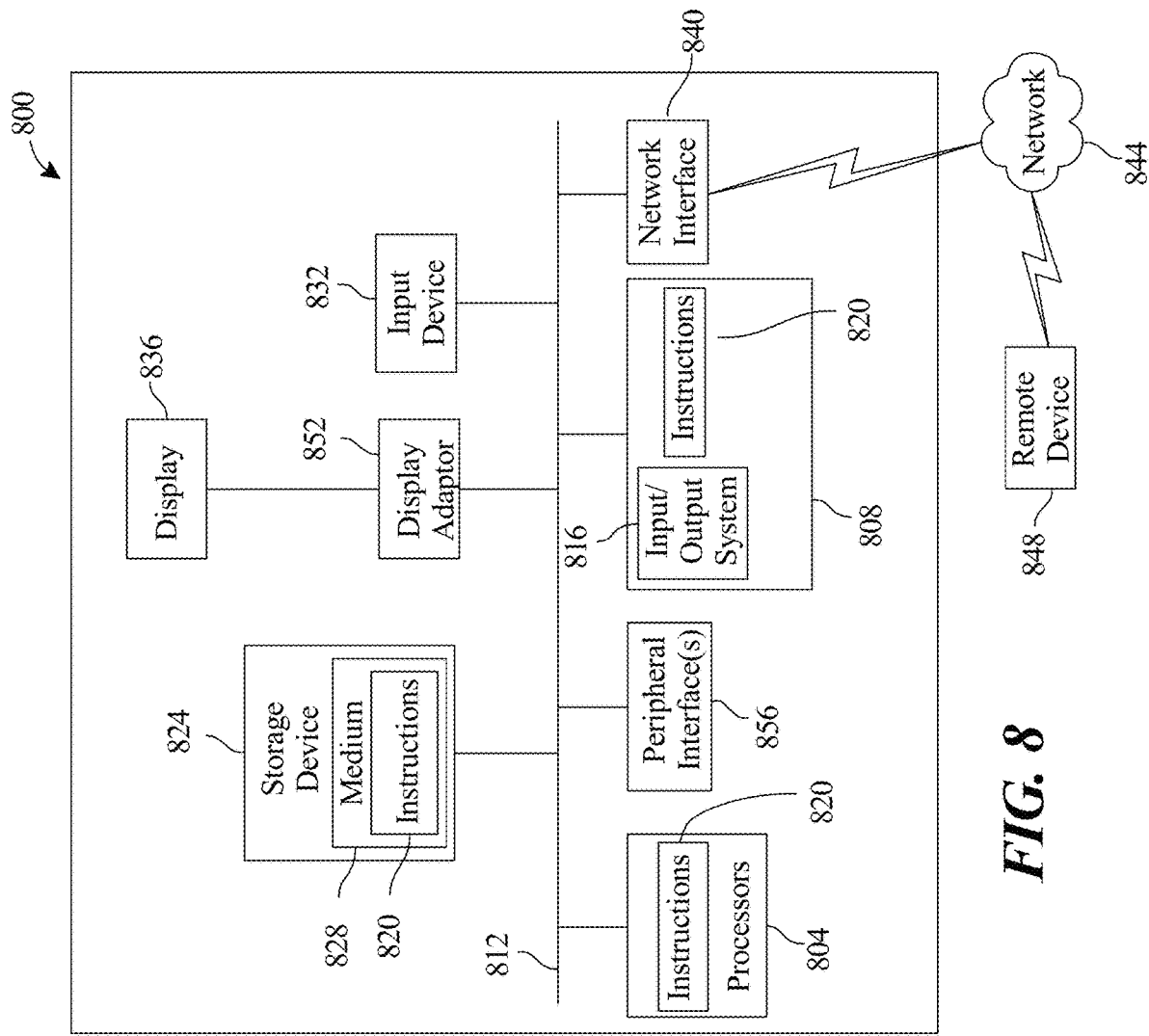
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for customization and utilization of target profiles, the apparatus comprising:
   a processor; and
   a memory communicatively connected to the processor, the memory containing instructions configuring the processor to:
   receive a data set comprising a plurality of target data;
   determine a validity status of the plurality of target data within the data set;
   modify the data set as a function of the validity status;
   determine one or more protection gaps within the modified data set using a gap finder module which includes a protection machine-learning model, wherein determining the one or more protection gaps utilizing the protection machine-learning model comprises:
   receiving protection training data from at least one of a user input and a communicatively connected database, wherein the protection training data comprises a plurality of target data elements correlated to a plurality of protection gap elements;
   training, iteratively, the protection machine-learning model using the protection training data, wherein training the protection machine-learning model includes retraining the protection machine-learning model with feedback from previous iterations of the protection machine-learning model; and
   determining the one or more protection gaps as a function of the modified data set and the validity status using the trained protection machine-learning model;
   generate one or more target profiles as function of the modified data set, the one or more protection gaps, and a user input; and
   a graphical user interface as a function of the one or more target profiles.

2. The apparatus of claim 1, wherein each of the plurality of target data comprises an origination datum.

3. The apparatus of claim 2, wherein the memory further contains instructions configuring the processor to record the plurality of origination datums to one or more origination files.

4. The apparatus of claim 1, wherein determining the validity status of the plurality of target data comprises comparing the plurality of target data to a validity threshold.

5. The apparatus of claim 1, wherein:
   the plurality of target data comprises at least a geographical datum; and
   generating the one or more target profiles comprises:
   generating the one or more target profiles as a function of the at least a geographical datum.

6. The apparatus of claim 1, wherein generating the one or more target profiles as a function of the modified data set and the user input comprises receiving a scorecard as a function of the user input.

7. The apparatus of claim 1, wherein the one or more target profiles comprise a stewardship file and a risk report file, wherein generating the one or more target profile comprises:
- receiving a plurality of customization modules from a database; and
- selecting one or more customization modules as a function of the one or more protection gaps.

8. The apparatus of claim 1, wherein training the protection machine-learning model further comprises iteratively removing sets from the protection training data as a function of user feedback.

9. The apparatus of claim 1, wherein determining the one or more protection gaps comprises:
- sorting the modified data set into one or more protection categorizations; and
- the one or more protection gaps as a function of the sorting.

10. A method for customization and utilization of target profiles, the method comprising:
- receiving, by at least a processor, a data set comprising a plurality of target data;
- determining, by the at least a processor, a validity status of the plurality of target data within the data set;
- modifying, by the at least a processor, the data set as a function of the validity status;
- determining, by the at least a processor, one or more protection gaps within the modified data set using a gap finder module which includes a protection machine-learning model, wherein determining the one or more protection gaps utilizing the protection machine-learning model comprises:
  - receiving protection training data from at least one of a user input and a communicatively connected database, wherein the protection training data comprises a plurality of target data elements correlated to a plurality of protection gap elements;
  - training, iteratively, the protection machine-learning model using the protection training data, wherein training the protection machine-learning model includes retraining the protection machine-learning model with feedback from previous iterations of the protection machine-learning model; and
  - determining the one or more protection gaps as a function of the modified data set and the validity status using the trained protection machine-learning model;
- generating, by the at least a processor, one or more target profiles as function of the modified data set, the one or more protection gaps, and a user input; and
- modifying, by the at least a processor, a graphical user interface as a function of the one or more target profiles.

11. The method of claim 10, wherein each of the plurality of target data comprises an origination datum.

12. The method of claim 11, further comprising transmitting, by the at least a processor, the plurality of origination datums to one or more origination files.

13. The method of claim 10, wherein determining, by the at least a processor, the validity status of the plurality of target data comprises comparing the plurality of target data to a validity threshold.

14. The method of claim 10, wherein:
- the plurality of target data comprises at least a geographical datum; and
- generating, by the at least a processor, the one or more target profiles comprises:
  - generating the one or more target profiles as a function of the at least a geographical datum.

15. The method of claim 10, wherein generating the one or more target profiles as a function of the modified data set and the user input comprises receiving a scorecard as a function of the user input.

16. The method of claim 10, wherein the one or more target profiles comprise a stewardship file and a risk report file, wherein generating the one or more target profile comprises:
- receiving a plurality of customization modules from a database; and
- selecting one or more customization modules as a function of the one or more protection gaps.

17. The method of claim 10, wherein training the protection machine-learning model further comprises iteratively removing sets from the protection training data as a function of user feedback.

18. The method of claim 10, wherein determining the one or more protection gaps comprises:
- sorting the modified data set into one or more protection categorizations; and
- determining the one or more protection gaps as a function of the sorting.

* * * * *